(12) United States Patent
Wang et al.

(10) Patent No.: US 9,346,430 B2
(45) Date of Patent: May 24, 2016

(54) INFLATABLE SEATBELT

(71) Applicant: AUTOLIV ASP, INC., Ogden, UT (US)

(72) Inventors: Bin Wang, Windsor (CA); David W. Schneider, Waterford, MI (US); Patrick Patercsak, Davisburg, MI (US); Raj Valera, Rochester, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/483,672

(22) Filed: Sep. 11, 2014

(65) Prior Publication Data

US 2016/0075299 A1    Mar. 17, 2016

(51) Int. Cl.
*B60R 21/18* (2006.01)
*B60R 22/34* (2006.01)
*B60R 21/217* (2011.01)
*B60R 21/00* (2006.01)

(52) U.S. Cl.
CPC .............. *B60R 21/18* (2013.01); *B60R 21/217* (2013.01); *B60R 22/34* (2013.01); *B60R 2021/0044* (2013.01)

(58) Field of Classification Search
USPC ....................................... 280/733, 741, 801.1
See application file for complete search history.

(56) References Cited

U.S. PATENT DOCUMENTS

| | | | |
|---|---|---|---|
| 6,116,637 A * | 9/2000 | Takeuchi et al. .............. 280/733 |
| 6,220,626 B1 * | 4/2001 | Utsumi et al. ................. 280/733 |
| 6,244,621 B1 * | 6/2001 | Kameyoshi et al. .......... 280/733 |
| 6,419,264 B1 * | 7/2002 | Tsuji et al. ..................... 280/733 |
| 7,677,598 B1 * | 3/2010 | Ryan et al. .................. 280/730.2 |
| 2002/0130498 A1 * | 9/2002 | Kurata et al. .................. 280/733 |
| 2006/0055158 A1 * | 3/2006 | Park .............................. 280/733 |
| 2007/0102909 A1 * | 5/2007 | Nezaki et al. ................. 280/733 |
| 2009/0033077 A1 * | 2/2009 | Yamataki ...................... 280/733 |
| 2012/0169034 A1 * | 7/2012 | Yamataki ...................... 280/733 |
| 2013/0249200 A1 * | 9/2013 | Higuchi et al. ............... 280/733 |
| 2014/0246845 A1 * | 9/2014 | Johnson et al. ............... 280/733 |

* cited by examiner

*Primary Examiner* — Toan To
(74) *Attorney, Agent, or Firm* — Stephen T. Olson; Harness, Dickey & Pierce, P.L.C.

(57) ABSTRACT

A restraint system for a mobile platform incorporating a seat assembly having a seatback coupled to a seat bottom at a first end of the seatback is provided. The restraint system may include a belt portion having a first end connected to one of the mobile platform and the seatback proximate to a second end of the seatback opposite the first end and a second end connected to one of the mobile platform and the seat bottom proximate to the seat bottom. The second end may be connected to one of the mobile platform and the seat bottom via a retractor.

26 Claims, 12 Drawing Sheets

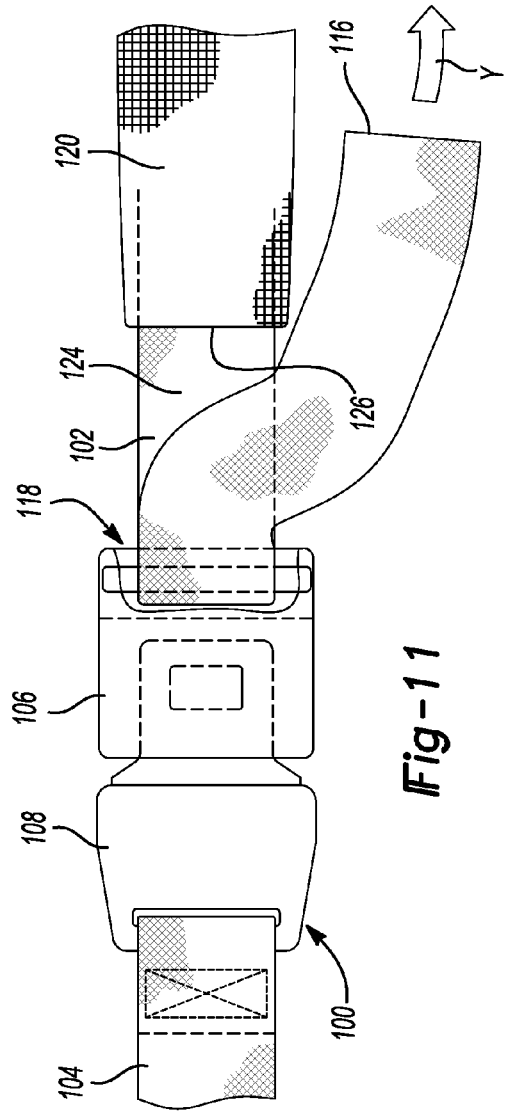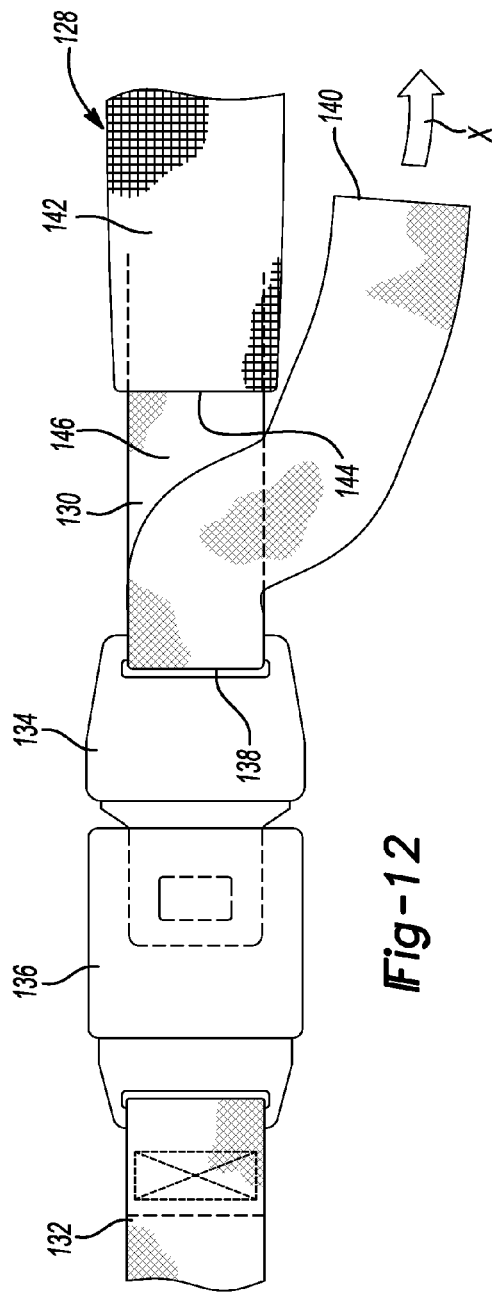

INFLATABLE SEATBELT

FIELD

The present disclosure relates to an inflatable seatbelt and more particularly to an inflatable seatbelt incorporating a shoulder-mounted inflator.

BACKGROUND

This section provides background information related to the present disclosure which is not necessarily prior art.

Mobile platforms such as automotive vehicles typically include one or more airbags that work in conjunction with one another and with other safety systems to absorb or otherwise dissipate energy associated with an impact event away from occupants of the mobile platform. For example, a mobile platform such as a vehicle may incorporate one or more front airbags mounted in a steering wheel or instrument panel of the vehicle that absorb energy associated with a front-impact event. Likewise, a vehicle may additionally incorporate a side airbag in a door, pillar and/or seat assembly of the vehicle in an effort to absorb energy associated with a side-impact event.

Mobile platforms also include seatbelt assemblies that work in conjunction with inflatable restraints such as front airbags and side airbags. In fact, some seatbelt assemblies incorporate an inflatable portion that works in conjunction with the seatbelt assembly to absorb forces associated with an impact event and/or to direct such forces into the structure of the mobile platform and away from vehicle occupants.

Seatbelt assemblies that have an integral inflatable portion or an airbag attached to webbing of the seatbelt assembly typically include a shoulder-mounted retractor that selectively allows the webbing to payout from the retractor so that the webbing can be properly positioned relative to a vehicle occupant. Such seatbelt assemblies also include an inflator that selectively provides the inflatable portion or airbag of the seatbelt assembly with pressurized gas to move the inflatable portion or airbag from a pre-deployed state to an inflated state.

Conventional inflators associated with seatbelt assemblies are necessarily located proximate to a seat bottom of a seat assembly, as locating the inflator proximate to the shoulder-mounted retractor is not possible. Specifically, because the retractor selectively pays out and retracts webbing of the seatbelt assembly, an inflator cannot be located along a length of the webbing such that the inflator is located near the retractor, as a conventional inflator cannot maintain a fluid connection with the inflatable portion or airbag during payout or retraction of the seatbelt. Accordingly, conventional inflators are fixedly mounted to the seat assembly and/or to the surrounding structure of the mobile platform in an area proximate to the seat bottom to allow the inflator to remain stationary during all modes of operation of the seatbelt assembly.

Mounting an inflator proximate to a seat bottom of a seat assembly allows the inflator to remain stationary during use of the seatbelt assembly both during payout and retraction of the seatbelt webbing, as the inflator is only fluidly coupled to the inflatable portion or airbag when a tongue of the seatbelt assembly is received within a buckle. In other words, it is the connection of the tongue and buckle that places the inflator in fluid communication with the inflatable portion or airbag and, as such, the inflator is typically disposed in closed proximity to the buckle near the seat bottom and communicates high-pressure gas to the inflatable portion or airbag via the buckle and tongue.

While positioning an inflator proximate to a buckle of a seatbelt assembly adequately allows the inflator to selectively supply an inflatable portion or airbag associated with the seatbelt assembly with high-pressure gas, such a configuration requires that the inflatable portion or airbag be in fluid communication with the inflator via the tongue and buckle. Requiring fluid communication between the tongue and the buckle complicates the construction of both the tongue and the buckle and often results in both components having an undesirable size, shape, and configuration. Further, requiring the inflator to communicate high-pressure gas to the inflatable portion or airbag via the tongue and buckle requires multiple fluid connections between the inflator and the inflatable portion or airbag, thereby increasing the overall cost of the system and the likelihood of a system leak.

SUMMARY

This section provides a general summary of the disclosure, and is not a comprehensive disclosure of its full scope or all of its features.

A restraint system for a mobile platform incorporating a seat assembly having a seatback coupled to a seat bottom at a first end of the seatback is provided. The restraint system may include a belt portion having a first end connected to one of the mobile platform and the seatback proximate to a second end of the seatback opposite the first end and a second end connected to one of the mobile platform and the seat bottom proximate to the seat bottom. The second end may be connected to one of the mobile platform and the seat bottom via a retractor.

In another configuration, a restraint system for a mobile platform incorporating a seat assembly having a seatback coupled to a seat bottom at a first end of the seatback is provided. The restraint system may include a belt portion having an inflatable portion, a first end connected to one of the mobile platform and the seatback proximate to a second end of the seatback opposite the first end of the seatback, and a second end connected to one of the mobile platform and the seat bottom proximate to the seat bottom. An inflator may be in fluid communication with the inflatable portion and may be disposed proximate to the first end of the belt portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
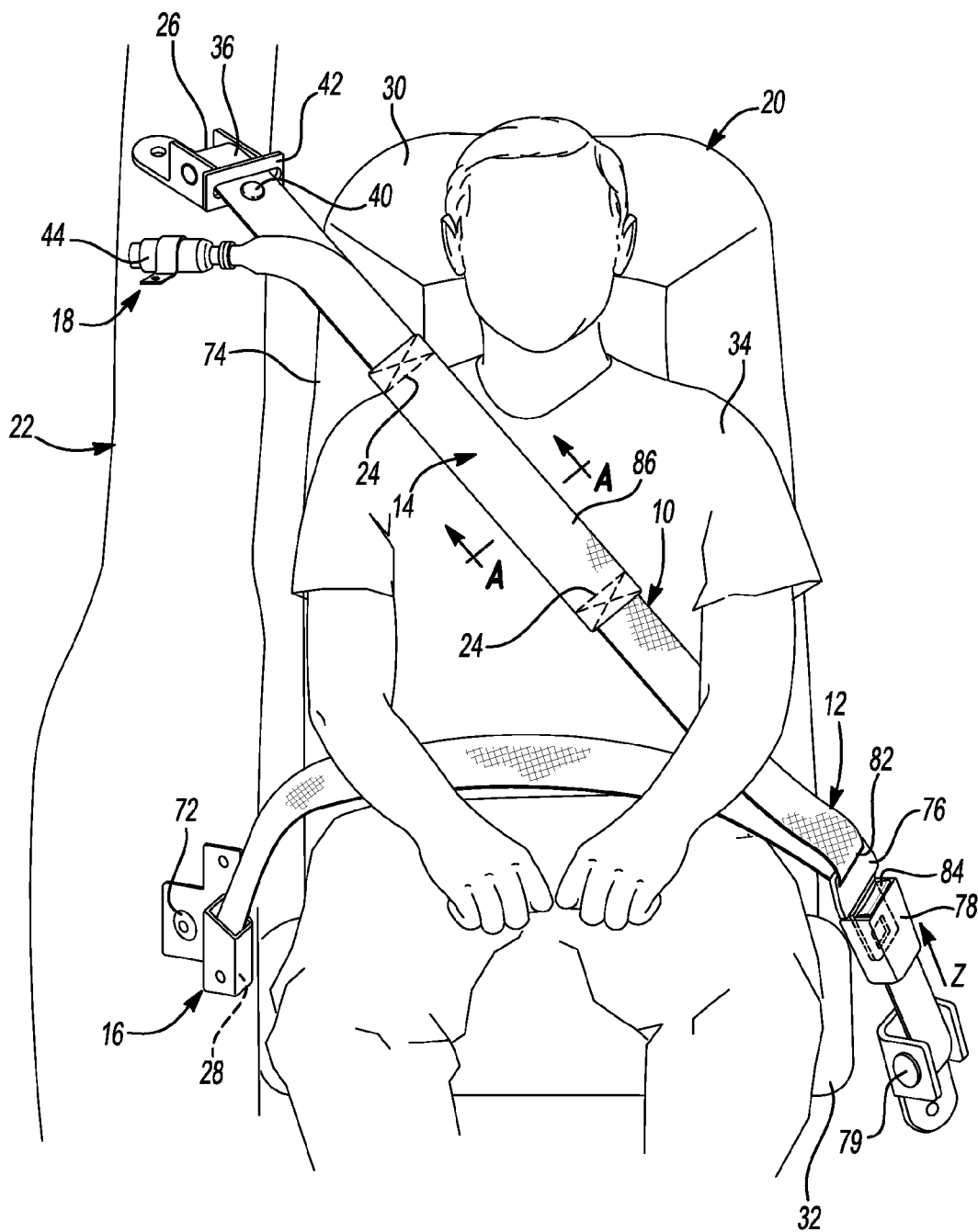
FIG. 1 is a partial perspective view of a mobile platform incorporating a restraint device in accordance with the principles of the present disclosure for use in conjunction with a seat assembly.
Figure 6:
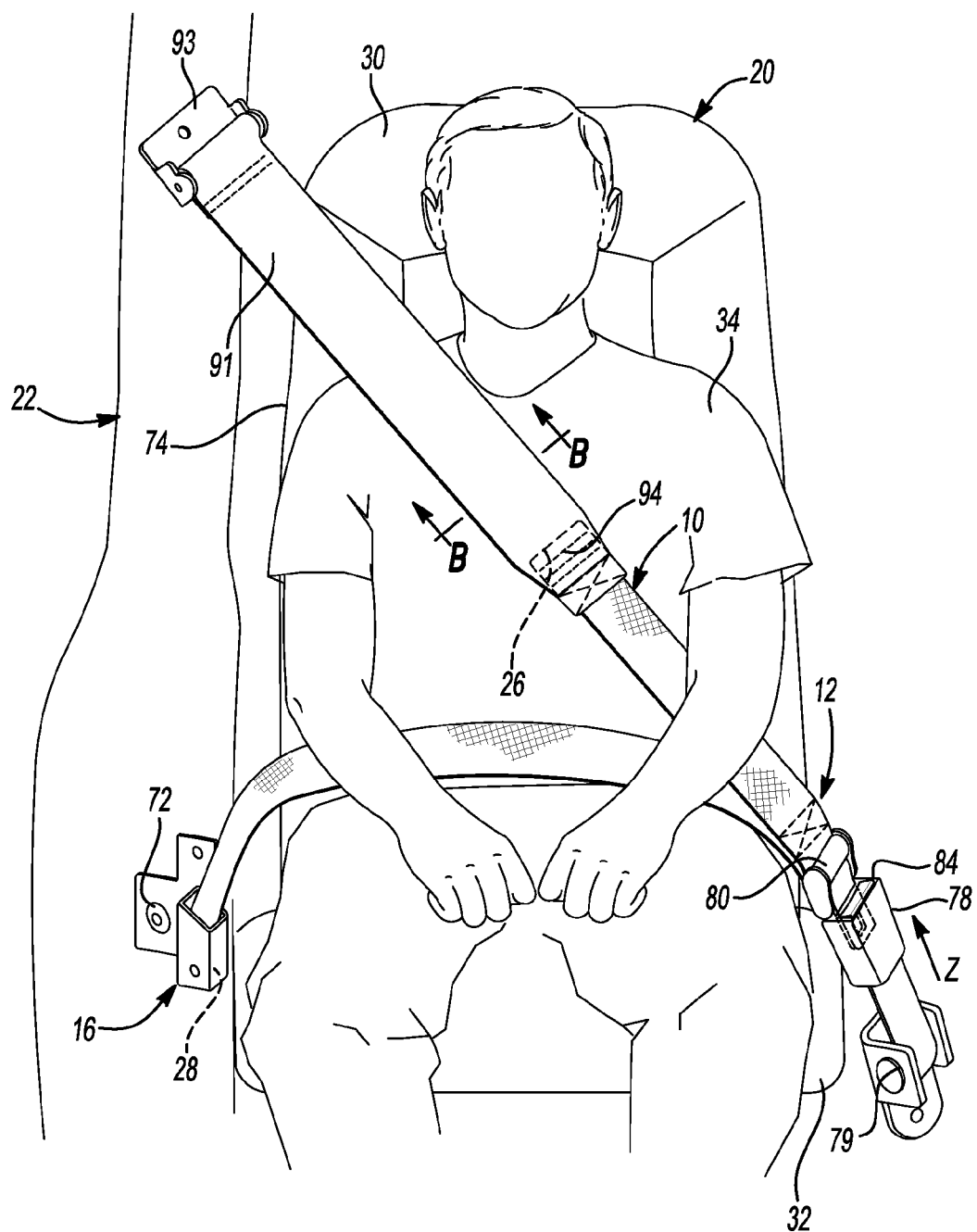
FIG. 6 is a partial perspective view of a mobile platform incorporating a restraint device in accordance with the principles of the present disclosure for use in conjunction with a seat assembly.
Figure 7:
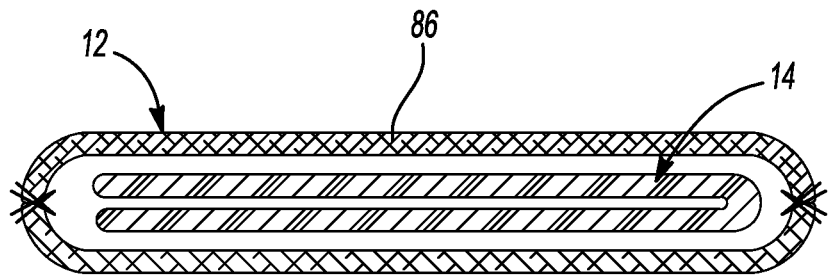
Figure 8:
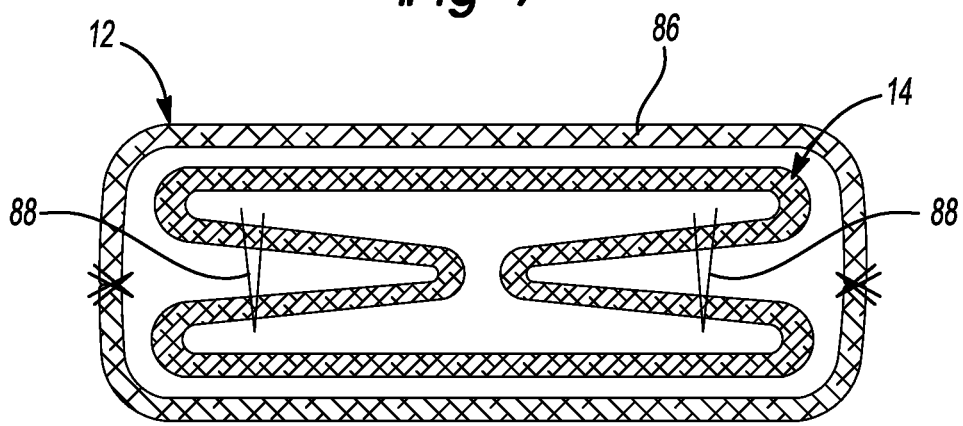
Figure 9:
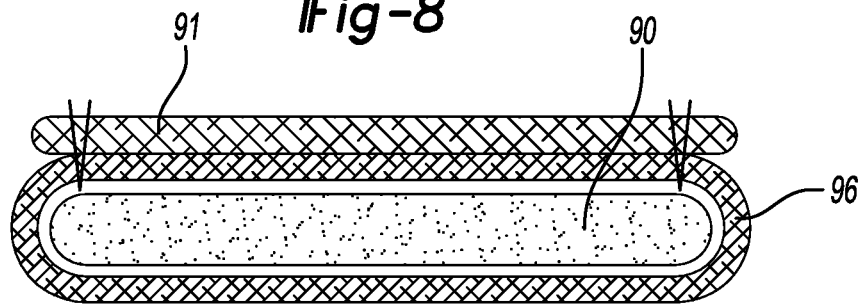
Figure 10:
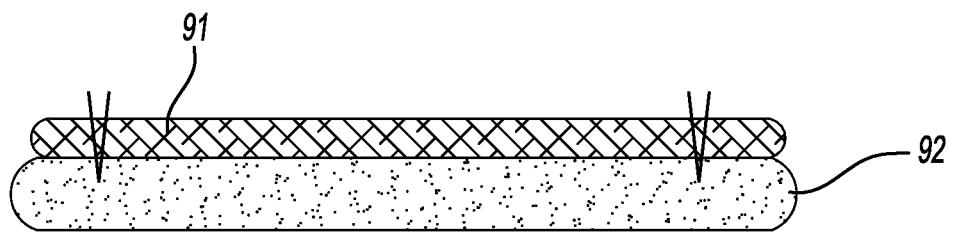
Figure 13:
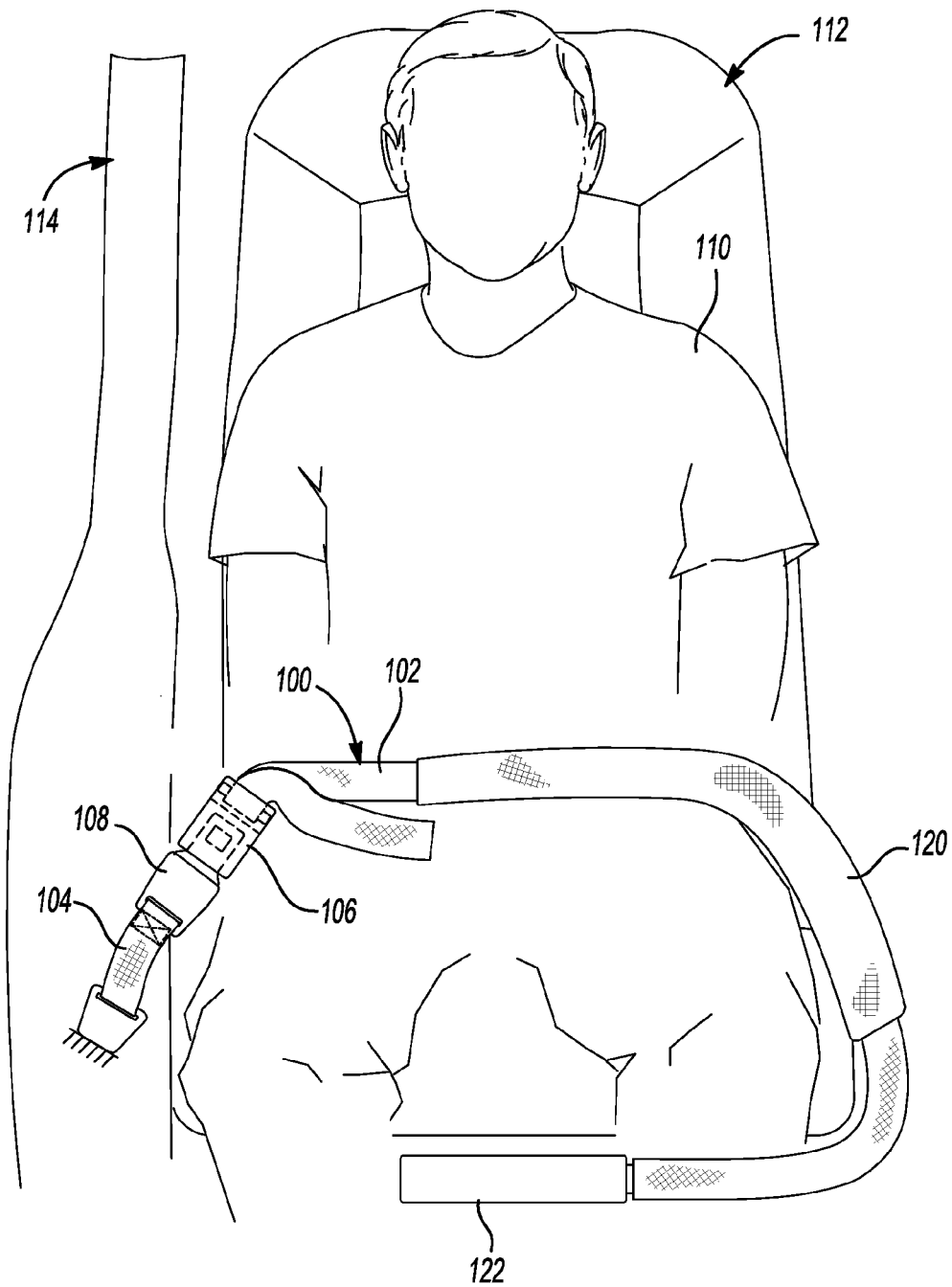
Figure 14:
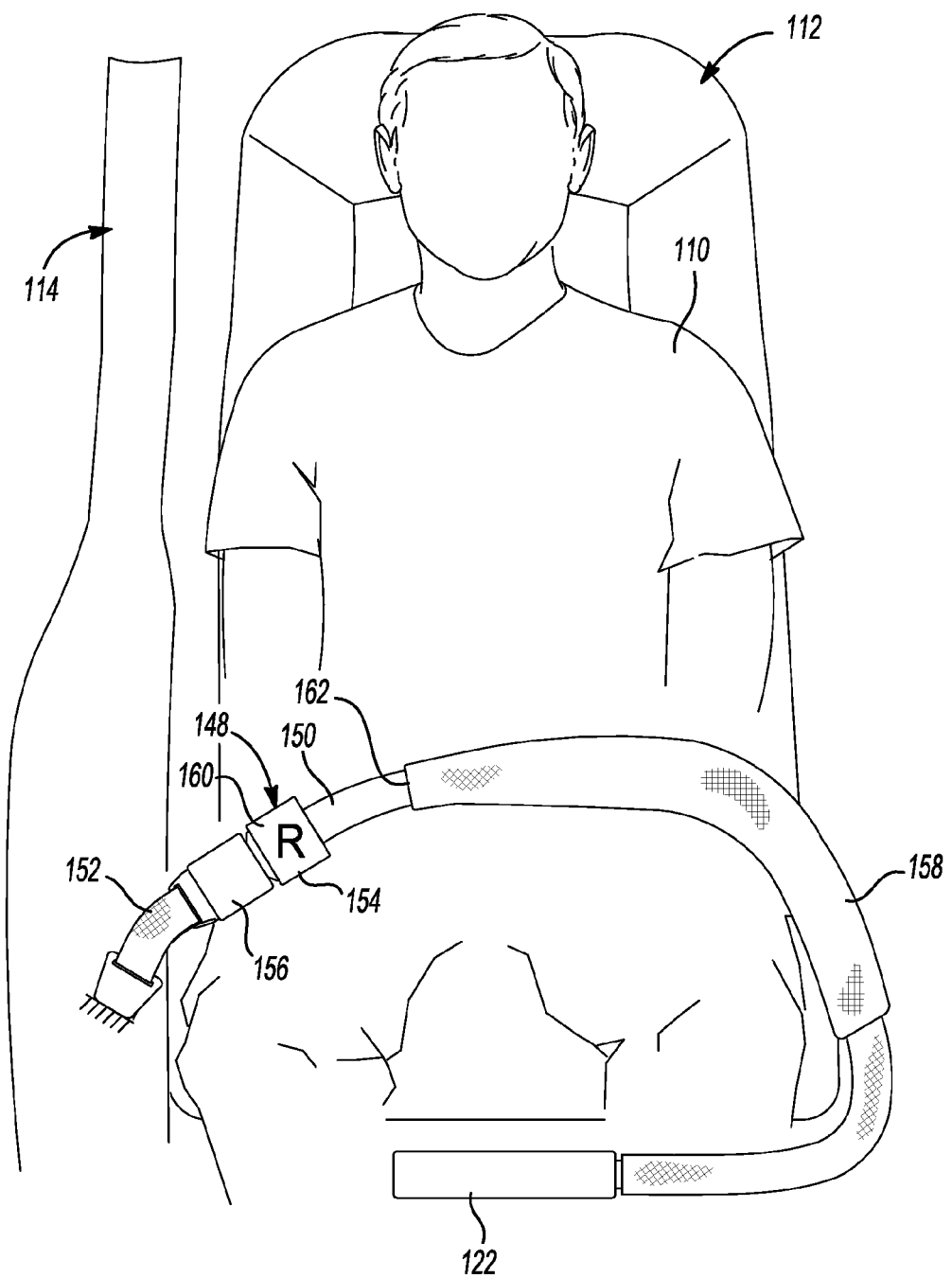
Figure 15:
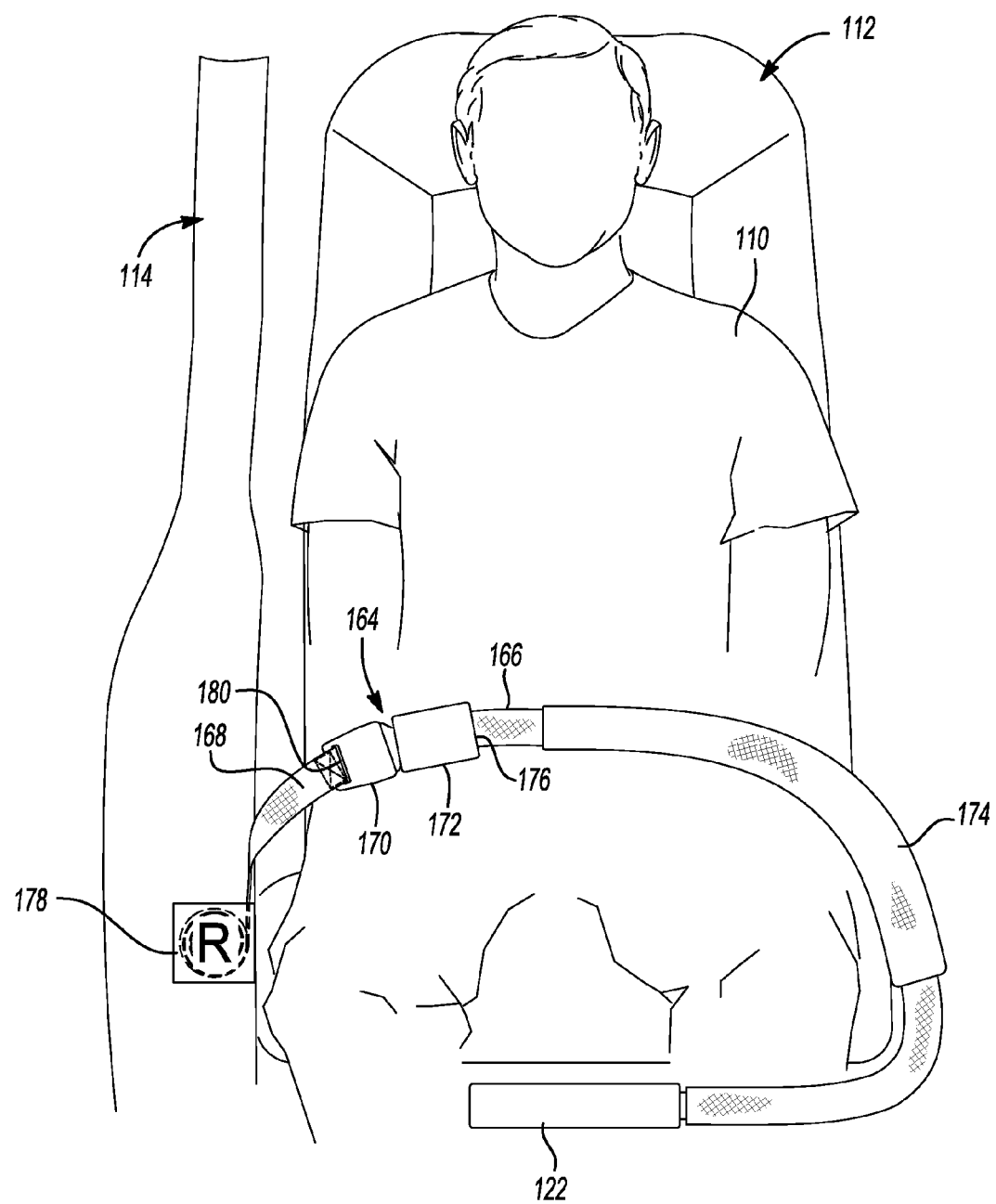
Figure 16:
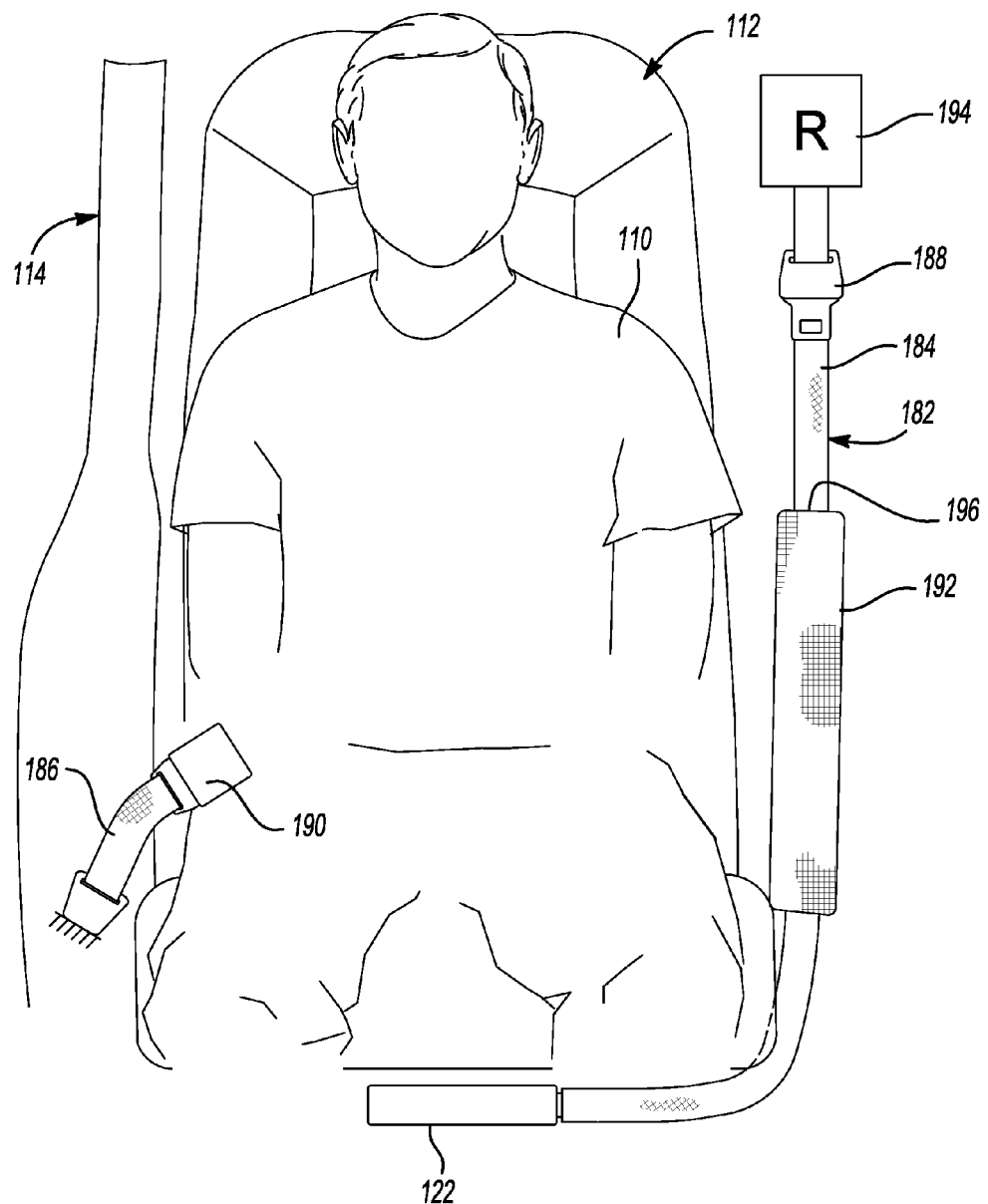
Figure 17:
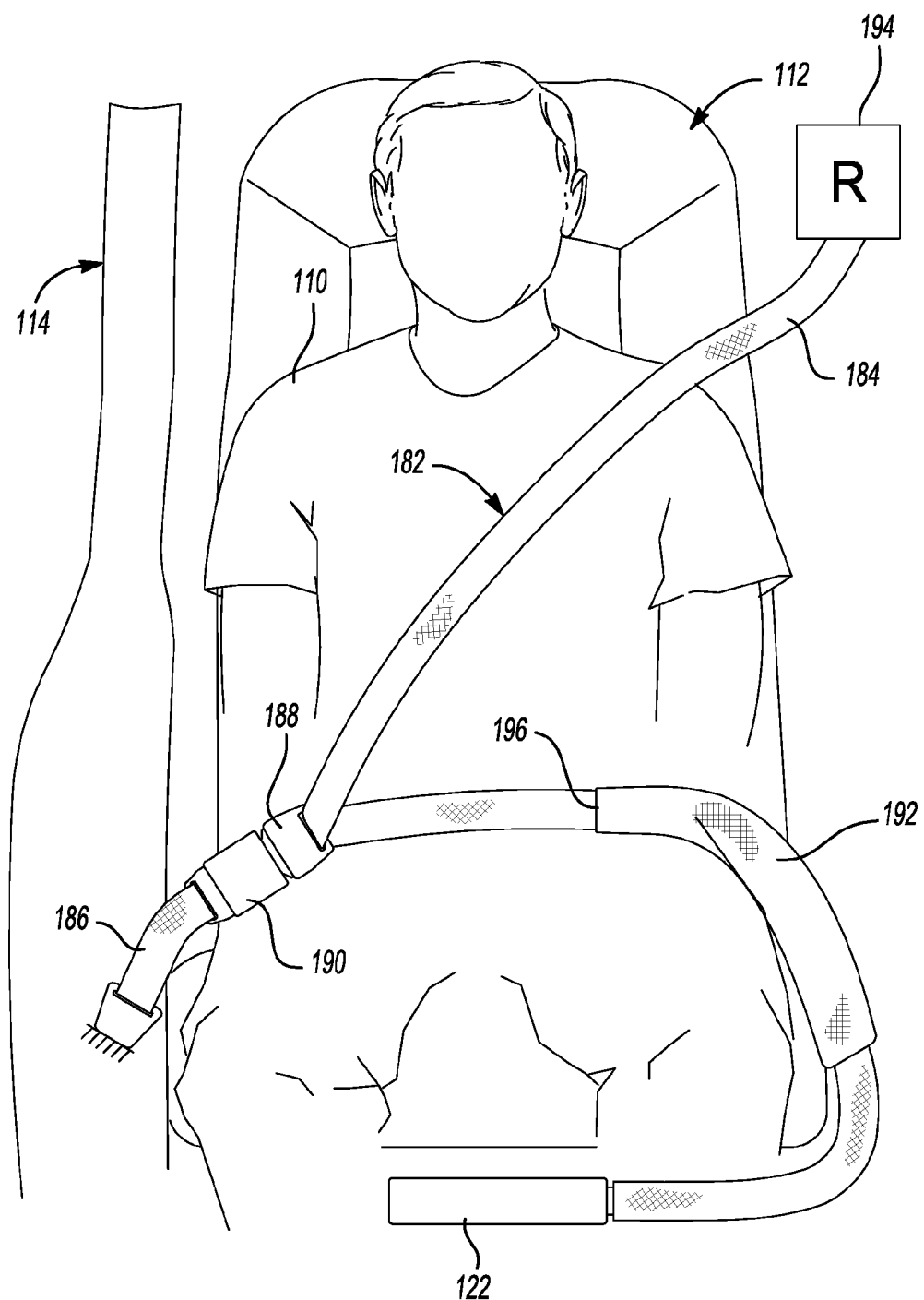

FIGS. 7 and 8 provide partial cross-sectional views of the restraint device of FIG. 1 taken along line A-A detailing alternate constructions of an inflatable portion of the restraint device of FIG. 1;

FIGS. 9 and 10 provide cross-sectional views of the restraint device of FIG. 6 taken along line B-B;

FIG. 11 is a partial front view of a restraint device in accordance with the principles of the present disclosure;

FIG. 12 is a partial front view of a restraint device in accordance with the principles of the present disclosure;

FIG. 13 is a front view of a seat assembly incorporating the restraint device of FIG. 11 in a use state;

FIG. 14 is a front view of a seat assembly incorporating a restraint device in accordance with the principles of the present disclosure and in a use state;

FIG. 15 is a front view of a seat assembly incorporating a restraint device in accordance with the principles of the present disclosure and in a use state;

FIG. 16 is a front view of a seat assembly incorporating a restraint device in accordance with the principles of the present disclosure and in a stowed state; and FIG. 17 is a front view of a seat assembly incorporating a restraint device in accordance with the principles of the present disclosure and in a use state.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a restraint device 10 is provided and may include a belt 12 having an inflatable or cushion portion 14, a retractor assembly 16 that selectively pays out a portion of the belt 12 or retracts the belt 12, and an inflator assembly 18 that selectively moves the inflatable portion 14 from a pre-deployed state to an inflated state. The restraint device 10 may be used in conjunction with a seat assembly 20 of a mobile platform 22 such as, for example, an automotive vehicle, an aircraft, a train, or a bus.

The belt 12 may be formed from a woven material such as, for example, seatbelt webbing and/or airbag-cushion material. Specifically, the belt 12 may be formed from conventional seatbelt webbing, a cut-and-sewn airbag-cushion material, a one-piece woven (OPW) airbag-cushion material, and/or a laminate airbag-cushion material.

The inflatable portion 14 may be positioned at virtually any location along a length of the belt 12 and may be formed from the same material as the belt 12 or, alternatively, may be formed from a different material than the belt 12. For example, the inflatable portion 14 may be formed from the same material as the belt 12 such that the belt 12 and the inflatable portion 14 are formed from an airbag-cushion material. Alternatively, the belt 12 may be formed from conventional seatbelt webbing while the inflatable portion 14 is formed from an airbag-cushion material. If the belt 12 is formed from seatbelt webbing and the inflatable portion 14 is formed from airbag-cushion material, the inflatable portion 14 may be attached to the belt 12 via stitching 24. In order to ensure a uniform tensile strength of the belt 12, the seatbelt webbing may be a continuous piece of material along the length of the belt 12.

Regardless of the particular construction of the belt 12 and the inflatable portion 14, the inflatable portion 14 may be positioned along a length of the belt 12 such that the inflatable portion 14 is positioned relative to a torso of an occupant when seated in the seat assembly 20. The inflatable portion 14 may be moved from a pre-deployed state (FIG. 1) to an inflated state (not shown) via the inflator assembly 18. Specifically, the inflatable portion 14 may be filled with a pressurized gas received from the inflator assembly 18 in an effort to utilize the inflatable portion 14 as a cushion to dissipate forces associated with an impact event experienced by the mobile platform 22 away from an occupant.

The belt 12 may include a first end 26 and a second end 28 that are each connected to one of the seat assembly 20 and the mobile platform 22. Specifically, the first end 26 may be attached to one of the seat assembly 20 and the mobile platform 22 proximate to a top portion of a seatback 30 of the seat assembly 20. The first end 26 may be attached to the seat assembly 20 or to the mobile platform 22 proximate to a top portion of the seatback 30 such that the first end 26 is positioned at an opposite end of the seatback 30 than a junction of the seatback 30 and a seat bottom 32 of the seat assembly 20. In so doing, the first end 26 is positioned proximate to a shoulder of an occupant 34 seated in the seat assembly 20 (FIG. 1). Conversely, the second end 28 may be attached to one of the seat assembly 20 and the mobile platform 22 proximate to the seat bottom 32. As such, the second end 28 may be positioned proximate to a hip of the occupant 34 when in use.

Figure 4:
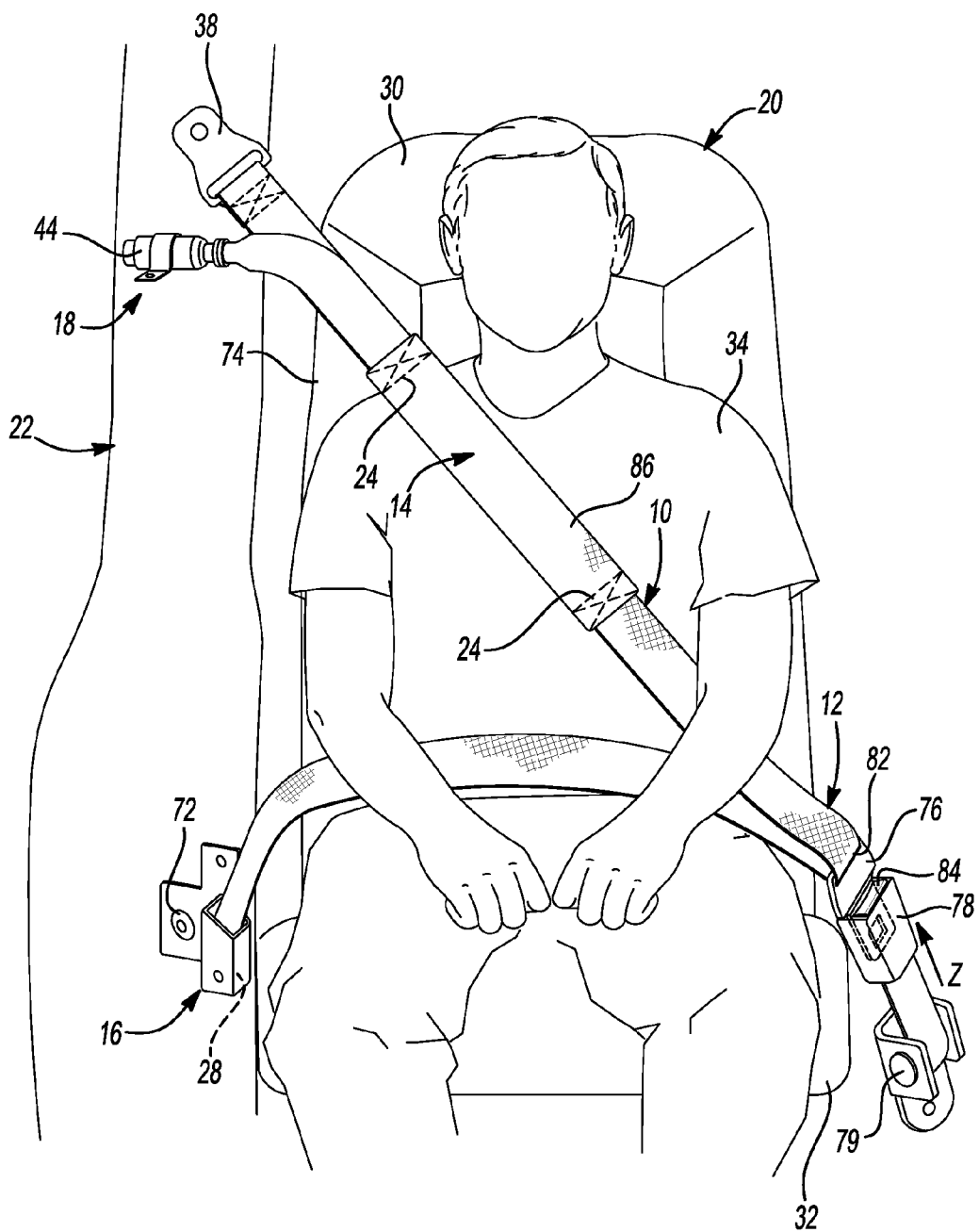
FIG. 4 is a partial perspective view of a mobile platform incorporating a restraint device in accordance with the principles of the present disclosure for use in conjunction with a seat assembly.

While the first end 26 and the second end 28 of the belt 12 may be attached to either the seat assembly 20 or the mobile platform 22, the first end 26 and the second end 28 will be described and shown hereinafter as being attached to the mobile platform 22. The first end 26 may be attached to the mobile platform 22 via a retractor 36 (FIG. 1) or, alternatively, may be attached to the mobile platform 22 via an anchor 38 (FIG. 4). The retractor 36 may be a so-called load-limiting retractor or load-limiting anchor, or, alternatively, may be a pre-tensioning retractor 36. Accordingly, the retractor 36 does not payout any of the belt 12 during normal use of the restraint device 10. Rather, the retractor 36 only pays out a length of the belt 12 when the belt 12 is subjected to a force of a predetermined magnitude. Namely, when the mobile platform 22 experiences an impact event, the occupant 34 may exert a force on the belt 12 that meets or exceeds a predetermined threshold, thereby causing the retractor 36 to payout a predetermined length of the belt 12. In one configuration, the retractor 36 may payout approximately 150-250 mm of webbing when the occupant 34 loads the belt 12. If the retractor 36 is a so-called pre-tensioning retractor, the retractor 36 may spool a portion of the belt 12 when the mobile platform 22 experiences an impact event. In so doing, the belt 12 exerts a force on the occupant 34 via the retractor 36 to draw the torso of the occupant 34 toward the seatback 30.

While the retractor 36 is described as being a load-limiting retractor or a pre-tensioning retractor, the retractor 36 could alternatively function as a conventional retractor that pays out a relatively short length of webbing when a force is applied to the belt 12 during normal use of the restraint device 10. For example, the retractor 36 may be configured to payout a relatively small amount of webbing when a force is applied to the belt 12 to allow the occupant 34 a wide range-of-motion when seated in the seat assembly 20. For example, the retractor 36 may allow the occupant 34 to exert a force on the belt 12 to payout 150-250 mm of webbing during normal use of the restraint device 10. When the force applied to the belt 12 is released, however, the retractor 36 may once again spool the webbing to reduce the effective length of the belt 12.

In one configuration, the belt 12 may include a stopper 40 that cooperates with a trim component 42 to provide a hard stop for the belt 12 when the retractor 36 exerts a force on the belt 12 to retract the webbing. Cooperation between use of a stopper 40 and a trim component 42 permits the retractor 36 to include a relatively strong spooling mechanism (not shown) that exerts a relatively large force on the belt 12 when spooling a portion of the webbing. The stopper 40 and trim component 42 ensure that the belt 12 does not exert an uncomfortable amount of force on the occupant 34 under normal-use conditions of the restraint device 10.

When the anchor 38 is used to attach the first end 26 of the belt 12 to the mobile platform 22, the first end 26 may be fixed for movement with the mobile platform 22. Alternatively, the first end 26 may be attached to the mobile platform 22 via the anchor 38 in such a way that the anchor 38 is permitted to rotate relative to the mobile platform 22 but is not permitted to move in a direction along a longitudinal axis of the belt 12. In either configuration, whether the anchor 38 is permitted to rotate relative to the mobile platform 22 or is fixed for movement with the mobile platform 22, movement of the belt 12 along a longitudinal axis of the belt 12 is not permitted.

As described, the belt 12 may be attached to the mobile platform 22 at the first end 26 via a retractor 36 (FIG. 1) or via an anchor 38 (FIG. 4). If the anchor 38 is employed, the belt 12 is not permitted to move away from the mobile platform 22 in a direction along a longitudinal axis of the belt 12. If a retractor 36 is employed, however, the first end 26 of the belt 12 may be permitted to move away from the mobile platform 22 and in a direction along a longitudinal axis of the belt 12 if a sufficient force is applied to the belt 12 (i.e., if the retractor is a load-limiting retractor). The retractor 36 may also be configured to payout only a small portion of the belt 12 during normal use of the restraint device 10 and/or may include a pre-tensioning feature that serves to spool a portion of the belt 12 when the mobile platform 22 experiences an impact event. Because the belt 12 is not permitted to move away from the mobile platform 22 or, alternatively, is only permitted to move a small amount away from the mobile platform 22 (i.e., when a retractor 36 is employed), the inflator assembly 18 may be positioned proximate to the first end 26 of the belt 12, as shown in FIGS. 1 and 4.

Figure 2:
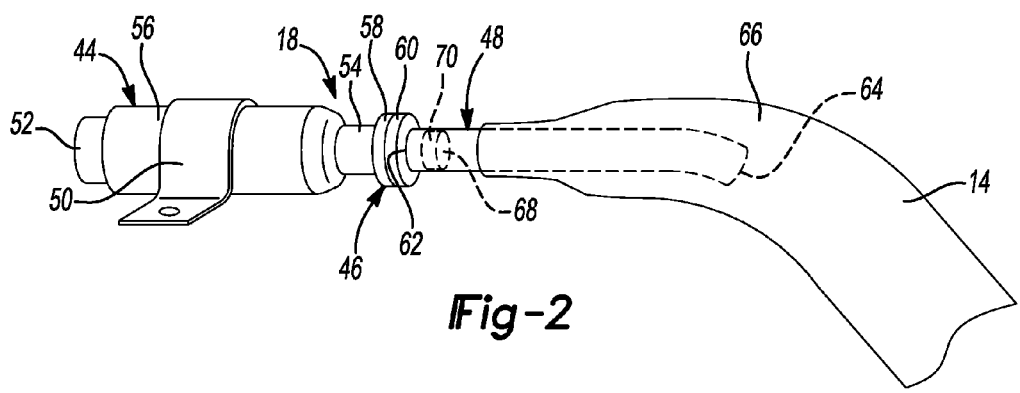
FIG. 2 is a partial perspective view of the restraint device of FIG. 1 in a pre-deployed state.
Figure 3:
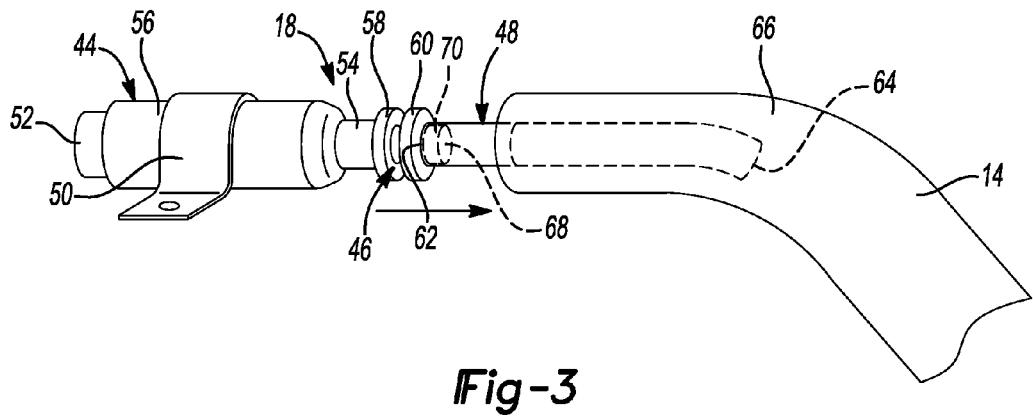
FIG. 3 is a partial perspective view of the restraint device of FIG. 1 in an inflated state.

With particular reference to FIGS. 1-3, the inflator assembly 18 is shown to include an inflator 44, a connector 46, and a fill tube 48. The inflator 44 may be attached to one of the seat assembly 20 and the mobile platform 22 via a bracket 50 such that the inflator 44 and bracket 50 are fixed for movement with the seat assembly 20 or mobile platform 22. The inflator 44 may include a first end 52 that attaches to an electrical system (not shown) of the mobile platform 22, a second end 54 in fluid communication with the fill tube 48 via the connector 46, and a generally cylindrical body 56 extending between the first end 52 and the second end 54. The first end 52 may be attached to a squib (not shown) of the inflator 44 that ignites a pyrotechnic material disposed within the inflator 44 to generate or release high-pressure gas. Alternatively, the inflator 44 may be a cold gas inflator that releases compressed high-pressure gas without igniting a pyrotechnic material. The high-pressure gas may be helium, argon, or a mixture thereof. The high-pressure gas may be communicated to the inflatable portion 14 of the belt 12 via the connector 46 and the fill tube 48 to move the inflatable portion 14 from the pre-deployed state to the inflated state.

The connector 46 may include a first portion 58 and a second portion 60. The first portion 58 may be attached to the second end 54 of the inflator 44 such that the first portion 58 is in fluid communication with the second end 54 and cylindrical body 56 of the inflator 44. The second portion 60 may be detachably connected to the first portion 58 (FIG. 2) to allow high-pressure gas generated by the inflator 44 to be received by the second portion 60 via the first portion 58 and the second end 54 of the inflator 44. The second portion 60 may be attached to the fill tube 48 to allow high-pressure gas to pass from the inflator 44 to the inflatable portion 14 via the first portion 58, the second portion 60, and the fill tube 48.

The fill tube 48 may be formed from a relatively flexible material that permits the fill tube 48 to bend relative to the inflator 44. The fill tube 48 may include a first end 62 that is fluidly connected to the second portion 60 of the connector 46 and a second end 64 that is received within a throat 66 of the inflatable portion 14 to allow the fill tube 48 to communicate high-pressure gas to the inflatable portion 14 via the throat 66. In one configuration, the inflatable portion 14 may be an airbag assembly attached to the belt 12. The airbag assembly may include the throat 66 and may be moved from the pre-deployed state to the inflated state when a high-pressure gas is received by the airbag assembly from the inflator 44. If the inflatable portion 14 is integrally formed with the belt 12, the throat 66 is in fluid communication with the inflatable portion 14 and communicates high-pressure gas from the inflator 44 to the inflatable portion 14.

A valve mechanism 68 may be disposed within and proximate to the second end 64 of the fill tube 48 to allow the second end 64 of the fill tube 48 to remain sealed when the second portion 60 of the connector 46 is separated from the first portion 58. For example, when the mobile platform 22 experiences an impact event, the occupant 34 may exert a force on the belt 12, thereby causing the retractor 36 to permit a length of webbing to payout. Because the throat 66 is attached to the inflatable portion 14 (i.e., either to an airbag assembly or to an integrally formed cushion), when a force is applied to the belt 12 via the occupant 34, the force is likewise applied to the throat 66 via the inflatable portion 14. Applying a force to the throat 66 likewise causes a force to be applied to the fill tube 48 and, thus, to the connector 46. When the force applied to the connector 46 exceeds a predetermined threshold, the second portion 60 may separate from the first portion 58 to allow the fill tube 48 to move with the throat 66, as the occupant 34 loads the belt 12.

When the second portion 60 of the connector 46 is disconnected from the first portion 58, the high-pressurized gas disposed within the inflatable portion 14 may escape from the second portion 60. However, if the high-pressure gas escapes from the fill tube 48 via the second portion 60, the inflatable portion 14 will not provide a desired cushioning effect to the occupant 34 during the impact event.

The valve mechanism 68 may be used to maintain the high-pressure gas within the inflatable portion 14 to prevent the high-pressure gas from escaping the inflatable portion 14 at the second end 64 of the fill tube 48. In one configuration, the valve mechanism 68 may include a valve element 70 such as a ball or disk (FIGS. 2 and 3) that is urged against the second portion 60 of the connector 46 at the second end 64 of the fill tube 48 due to the high-pressure gas disposed within the inflatable portion 14.

The high-pressure gas disposed within the inflatable portion 14 may exert a force on the valve element 70, thereby causing the valve element 70 to move toward the second end 64 of the fill tube 48 and contact the second portion 60 (FIG. 3). The valve element 70 may seat within the second portion 60, thereby closing the second end 64 of the fill tube 48 and preventing the high-pressure gas from escaping the inflatable portion 14. In so doing, the valve mechanism 68 maintains the inflatable portion 14 in an inflated state and allows the inflatable portion 14 to be used as a cushion during an impact event.

The second end 28 of the belt 12 may be attached to the mobile platform 22 via a retractor 72. The retractor 72 may include a spring mechanism (not shown) that permits the webbing of the belt 12 to payout when a force is applied to the belt 12 during normal use of the restraint device 10. The spring mechanism likewise causes the belt 12 to be spooled when a force applied to the belt 12 is released to spool the webbing of the belt 12 within the retractor 72 when the restraint device 10 is not in use.

In operation, the retractor 72 may exert a force on the belt 12 via the spring mechanism to cause the belt 12 to spool within the retractor 72 when the belt 12 is not in use (i.e., when the belt 12 is in a relaxed state). In the relaxed state, the belt 12 may be positioned relative to the seat assembly 20 such that the belt 12 is substantially disposed on and adjacent to one side 74 of the seat assembly 20. When an occupant 34 is seated in the seat assembly 20, the occupant 34 may exert a force on the belt 12 to pull the belt 12 across the lap and torso of the occupant 34 effectively increasing the length of the belt 12 by causing the retractor 72 to payout webbing. Specifically, the force applied on the belt 12 by the occupant 34 overcomes the biasing force exerted on the belt 12 by the spring mechanism, which causes the retractor 72 to payout webbing and allows the belt 12 to be positioned over the lap and torso of the occupant 34.

If the first end 26 of the belt 12 is attached to the mobile platform 22 via an anchor 38, movement of the belt 12 into a use position—such that the belt 12 extends across a lap and torso of the occupant 34—is accomplished solely by the retractor 72 paying out webbing of the belt 12 when a force is applied to the belt 12 by the occupant 34. Similarly, if the first end 26 of the belt 12 is attached to the mobile platform 22 by a retractor 36, the retractor 72 associated with the second end 28 of the belt 12 may be solely responsible for paying out webbing to allow the belt 12 to be positioned over the lap and torso of the occupant 34 when the occupant 34 applies a force on the belt 12. Even if the retractor 36 associated with the first end 26 of the belt 12 is permitted to payout a small amount of webbing when a force is applied to the belt 12 by the occupant 34 during use, when the occupant 34 initially positions the belt 12 across the lap and torso of the occupant 34, the majority of webbing provided comes from the retractor 72 located proximate to the seat bottom 32 of the seat assembly 20. Only a small amount of webbing may be paid out from the retractor 36 associated with the first end 26 of the belt 12 once the occupant 34 is seated in the seat assembly 20.

Figure 5:
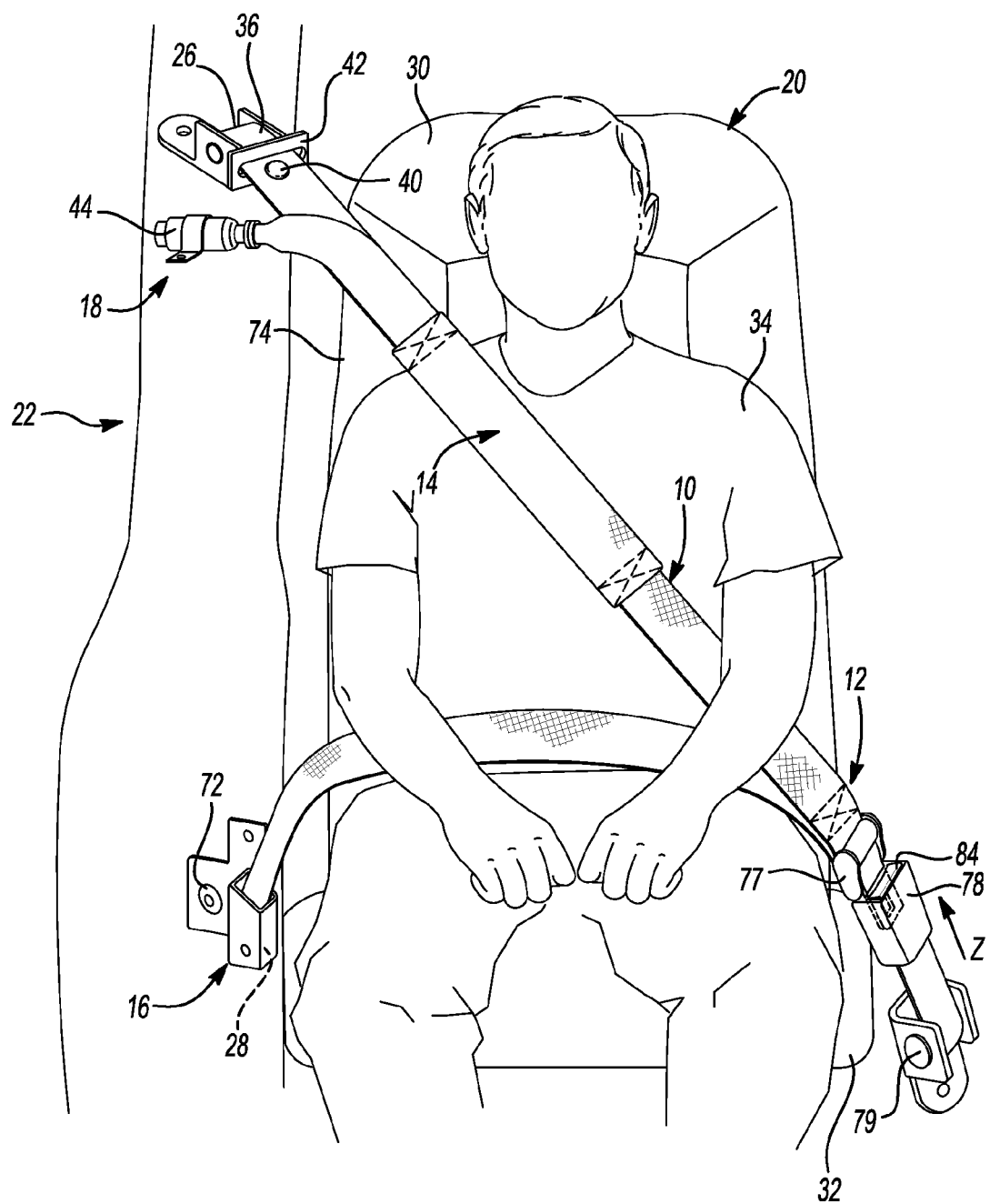
FIG. 5 is a partial perspective view of a mobile platform incorporating a restraint device in accordance with the principles of the present disclosure for use in conjunction with a seat assembly.

When the belt 12 is positioned relative to the occupant 34 at a desired location, the belt 12 may be retained in the desired position by inserting a tongue 76 into a buckle 78. With reference to FIGS. 4-6, the tongue 76 may be slidably supported along a length of the belt 12 and may include a roller 80 and/or oversized opening 82 that permits easy adjustment and movement of the tongue 76 along a length of the belt 12. Additionally, the tongue 76 may include a retractor 77 (FIG. 5) that pays out a small amount of webbing to further increase the length of the belt 12 at the tongue 76. For example, if the tongue 76 includes a retractor 77, the tongue 76 may be provided with a spring mechanism (not shown) that retracts a length of webbing of the belt 12 into the tongue 76 and around a spool (not shown) and selectively permits a length of webbing of the belt 12 to be paid out from the spool when a predetermined force is exerted on the tongue 76. The predetermined force may be set such that the tongue 76 pays out webbing during normal use of the restraint device 10 or, alternatively, the tension of the spring mechanism may be set such that the tongue 76 only pays out a length of webbing when the restraint device 10 is subjected to a force associated with an impact event experienced by the mobile platform 22.

The retractor 77 may be used to adjust a length of a torso portion of the belt 12 (i.e., extending between the retractor 77 and the first end 26) and the retractor assembly 16 may be used to adjust a length of a lap portion of the belt 12 (i.e., extending between the retractor 77 and the second end 28) during normal use of the restraint device 10. In such a configuration, the lap portion of the belt 12 may be fixed to the tongue 76 via stitching such that the retractor 77 only spools or pays out webbing of the torso portion of the belt 12 during normal use. While the lap portion of the belt 12 may be fixed relative to the retractor 77 for movement therewith, a length of the lap portion may be adjusted by selectively spooling or paying out webbing of the lap portion via the retractor assembly 16.

When an impact event is experienced, both the retractor assembly 16 and the retractor 77 lock up to prevent webbing payout or will pay out webbing at a predetermined load level of the lap portion and torso portion, respectively. Accordingly, the retractor assembly 16 and the retractor 77 may be so-called load-limiting retractors if either device pays out webbing at a predetermined load level. While the retractor assembly 16 is described as being a load-limiting retractor, the retractor assembly 16 may additionally or alternatively be a pre-tensioning retractor.

The buckle 78 may be positioned proximate to the seat bottom 32 of the seat assembly 20 and may be fixed for movement with one of the seat assembly 20 and the mobile platform 22. While the buckle 78 may be attached to the seat assembly 20 or the mobile platform 22, the buckle 78 will be described and shown as being attached to the mobile platform 22.

The buckle 78 may include a receptacle 84 that receives the tongue 76 when the tongue 76 is inserted into the buckle 78. When the tongue 76 is sufficiently inserted into the receptacle 84 of the buckle 78, the tongue 76 is fixed for movement with the buckle 78 and a position of the belt 12 relative to the lap and torso of the occupant 34 is maintained. The buckle 78 may include a retractor 79 that allows adjustment of the buckle 78 in a direction (Z) during normal use of the restraint device 10. Alternatively, the buckle 78 may be a so-called load-limiting buckle that only permits movement of the buckle 78 in the Z direction when the restraint device 10 is subjected to a force of a predetermined magnitude (i.e., a force consistent with the mobile platform 22 experiencing an impact event). Finally, the buckle 78 may include a pre-tensioning feature that exerts a force on the buckle 78 and moves the buckle 78 in a direction opposite to direction (Z) when the mobile platform 22 experiences an impact event. In so doing, the buckle 78 exerts a force on the tongue 76 which, in turn, exerts a force on the belt 12 to urge the occupant 34 in a direction toward the seat bottom 32 during the impact event.

With particular reference to FIGS. 6-8, the inflatable portion 14 is shown in detail. The inflatable portion 14 may be formed by positioning an airbag assembly proximate to the belt 12 and retaining the airbag assembly in close proximity to the belt 12 via a cover 86. The cover 86 may likewise be used if the inflatable portion 14 is integrally formed with the belt 12 if the inflatable portion 14 of the belt 12 is formed by folding a portion of the integrally formed inflatable portion 14 on itself such that multiple layers of airbag-cushion material are folded on one another (FIG. 7) or are formed in a tubular-webbed fold (FIG. 8). The folded airbag-cushion material or separate airbag assembly may additionally or alternatively be retained in a desired shape and position relative to the belt 12 via break stitching 88, as shown in conjunction with the tubular-webbed fold of FIG. 8.

An extension 91 may be attached to the first end 26 of the belt 12 via stitching 94 to attach the belt 12 to the mobile platform 22 (FIG. 6). The extension 91 may include a wider width than the belt 12 (i.e., between the first end 26 and the second end 28) to provide a wider area of support to the torso of the occupant 34. In one configuration, the extension 91 may extend under the inflatable portion 14 and/or may include a foam pad 90 or air bladder 92 (FIGS. 9 and 10) that further cushion the occupant 34 during an impact event, including a low-speed impact that may not deploy other occupant restraint systems (not shown), such as airbags. As such, the extension 91 may be used in conjunction with the belt 12 with or without the inflatable portion 14. While element 90 is described as a foam pad, element 90 could include virtually any material that is capable of compressing and absorbing energy associated with the occupant 34 loading the belt 12 during an impact event.

As described, the extension 91 may be used proximate to the inflatable portion 14 and may be disposed generally between the tongue 76 and the retractor 93 (FIG. 6) or between the tongue 76 and the anchor 38 (FIG. 4). For example, the extension 91 may be positioned under a portion of the inflatable portion 14 or, alternatively, may be positioned under the entire inflatable portion 14. While the extension 91 is described and shown as being attached to the first end 26 of the belt 12 via stitching 94, the extension 91 could alternatively be integrally formed with the belt 12 when the belt 12 is formed (i.e., such that the first end 26 of the belt 12 is formed by the extension 91).

Regardless of the particular construction of the extension 91 (i.e., whether attached to or integrally formed with the belt 12), the extension 91 may be used with a retractor 93 (FIG. 6) or anchor (not shown). The retractor 93 and anchor used in conjunction with the extension 91 are virtually identical to the retractor 36 (FIG. 1) and anchor 38 (FIG. 4) but are sized to accommodate the wider-width of the extension 91. Accordingly, a detailed description of the retractor 93 and anchor associated with the extension 91 is foregone.

The foam pad 90 and air bladder 92 may be located along a length of the belt 12 or, alternatively, along a length of the extension 91 (FIGS. 6, 9, 10) such that the foam pad 90 and/or air bladder 92 is positioned generally between the belt 12 or extension 91 and the occupant 34. For example, the foam pad 90 may include a housing 96 that supports the foam pad 90 relative to the belt 12 and provides a surface to which the belt 12 can be attached. The housing 96 may be a generally tubular webbing. In one configuration, the housing 96 may be stitched to the belt 12 proximate to the inflatable portion 14 to position the foam pad 90 generally between the inflatable portion 14 and the occupant 34.

While the restraint device 10 is shown and described as including an inflatable portion 14, the restraint device 10 could alternatively include a belt 12 without an inflatable portion 14. If the restraint device 10 does not include an inflatable portion, the belt 12 may be provided with any of the configurations shown in FIGS. 6, 9 and 10. Namely, the belt 12 may include a localized region of increased width (FIG. 6), a foam pad 90 (FIG. 9), and/or an air bladder 92 (FIG. 10) located in an area proximate to the torso of the occupant 34.

The foregoing elements (localized area of increased width, foam pad 90, air bladder 92) may be disposed between the first end 26 and the tongue 76, as the belt 12 is not retracted at the first end 26 but, rather, is retracted at the second end 28 via the retractor 72. Accordingly, the belt 12 may include a localized region of increased width, a foam pad 90, and/or an air bladder 92 disposed between the first end 26 and the tongue 76, as the portion of the belt 12 proximate to the first end 26 is not retracted via the retractor 36 and, if the retractor 36 exerts a force on the belt 12 to retract the belt 12, the foregoing elements 90, 92 may be sufficiently spaced apart from the first end 26 of the belt 12 such that elements 90, 92 never encounter the retractor 36.

Positioning the stopper 40 between elements 90, 92 and the retractor 36 likewise prevents elements 90, 92 from being drawn past the trim component 42 and into the retractor 36. With respect to providing the belt 12 with a localized region of increased width, the localized region of increased width (FIG. 6) may be spaced apart and separated from the first end 26 such that the stopper 40 is disposed between the localized region of increased width and the first end 26 to allow the retractor 36 to retract a portion of the belt 12 into the retractor 36 without encountering the localized region of increased width. In sum, any of the increased width portion of the belt 12, foam pad 90, and air bladder 92 may be used in conjunction with or without a belt 12 having an inflatable portion 14. Regardless of whether the belt 12 includes an inflatable portion 14, the localized region of increased width, foam pad 90, and/or air bladder 92 may be positioned proximate to the torso of the occupant 34 to provide a cushioning effect during an impact event experienced by the mobile platform 22.

With particular reference to FIGS. 1-3, operation of the restraint device 10 will be described in detail. When the restraint device 10 is in the relaxed state such that the belt 12 is entirely disposed proximate to the side 74 of the seat assembly 20, the tongue 76 is likewise positioned proximate to the side 74 of the seat assembly 20 and is not positioned within the buckle 78. When an occupant 34 is seated in the seat and applies a force on the belt 12, the effective length of the belt 12 is increased by webbing being paid out from the retractor 72. For example, the occupant 34 may exert a force on the belt 12 by exerting a force on the tongue 76, which moves along a length of the belt 12 and causes a force to be applied on the belt 12 and on the retractor 72. The force applied on the belt 12 overcomes the force exerted on the belt 12 by the spring mechanism of the retractor 72, thereby allowing the occupant 34 to increase the effective length of the belt 12 and position the belt 12 across the lap and torso of the occupant 34.

Once the retractor 72 pays out a sufficient length of the belt 12 such that the belt 12 extends over the lap and torso of the occupant 34, the tongue 76 may be positioned relative to the buckle 78 and may be inserted into the receptacle 84. Once the tongue 76 is sufficiently inserted into the receptacle 84 of the buckle 78, the tongue 76 is fixed for movement with the buckle 78 and the belt 12 is maintained in a normal-use position such that the belt 12 extends across the lap and torso of the occupant 34.

When the restraint device 10 is in the normal-use position (FIG. 1) such that the belt 12 extends across the lap and torso of the occupant 34, movement of the belt 12 may be permitted by the retractor 72 to provide the occupant 34 with the ability to move the belt 12 and achieve a comfortable seating position. If the first end 26 of the belt 12 is attached to the mobile platform 22 via the anchor 38 (FIG. 4), the occupant 34 is not permitted to move the first end 26 away from the mobile platform 22 in a direction along a longitudinal axis of the belt 12. However, if a retractor 36 is used to attach the first end 26 to the mobile platform 22 (FIG. 1), a force applied to the belt 12 may allow a relatively small length of belt 12 to be paid out from the retractor 36 (i.e., 150-250 mm of webbing) to provide the occupant 34 with the ability to comfortably move when seated in the seat assembly 20. Further, if the tongue 76 and/or buckle 78 include retractor functions, the tongue 76 and buckle 78 may likewise allow a small amount of webbing to be paid out, thereby allowing the occupant 34 to move somewhat freely when seated in the seat assembly 20 with the tongue 76 remaining secured to the buckle 78.

Should the mobile platform 22 experience an impact event such that the occupant 34 exerts a force on the belt 12, the force exerted on the belt 12 may cause the retractor 36 to permit a portion of the belt 12 to move away from the mobile platform 22 if the retractor 36 is functioning as a load-limiting retractor. In so doing, the belt 12 is permitted to payout from the retractor 36 and, as such, may exert a force on the inflator assembly 18.

When the mobile platform 22 initially experiences the impact event, a signal may be supplied to the first end 52 of the inflator 44, thereby causing the inflator 44 to generate high-pressure gas before the occupant 34 fully loads the belt 12. The high-pressure gas generated by the inflator 44 is communicated to the inflatable portion 14 of the belt 12 via the connector 46 and fill tube 48, thereby causing the inflatable portion 14 to move from the pre-deployed state to the inflated state.

Once the occupant 34 fully loads the belt 12, the belt 12 may be paid out from the retractor 36, thereby exerting a force on the connector 46 via the throat 66 (i.e., caused by movement of the occupant 34 relative to the seat assembly 20). Upon sufficient movement of the occupant 34 relative to the seat assembly 20, the force exerted on the throat 66 may be transmitted to the connector 46 such that the second portion 60 is separated from the first portion 58. At this point, the inflatable portion 14 may be sufficiently moved from the pre-deployed state to the inflated state such that the inflatable portion 14 is fully inflated and may therefore be used as a cushion. The valve mechanism 68—via the valve element 70—may be used to close the second end 64 of the fill tube 48 such that high-pressure gas disposed within the inflatable portion 14 is not permitted to escape from the second portion 60 of the connector 46. As such, the valve element 70 maintains the inflatable portion 14 in the inflated state, as the occupant 34 loads the belt 12 and the belt 12 moves away from the mobile platform 22 at the first end 26.

As described, the restraint device 10 provides a belt 12 that allows for positioning of the belt 12 under normal-use conditions by providing a retractor 72 located proximate to a seat bottom 32 of a seat assembly 20. The restraint device 10 likewise provides an inflatable portion 14 that is essentially transparent to the occupant 34 (i.e., appears to be a portion of the belt 12) and may be moved from a pre-deployed state to an inflated state by an inflator assembly 18 that is mounted proximate to a shoulder of an occupant 34. The inflator assembly 18—via the connector 46—allows the inflatable portion 14 to be moved from the pre-deployed state to the inflated state and, further, allows the inflatable portion 14 to be disconnected from the inflator assembly 18 when the belt 12 is moved away from the mobile platform 22 at the first end 26 during an impact event. The inflatable portion 14 is maintained in the inflated state by the valve mechanism 68 and, therefore, provides the occupant 34 with a cushion to absorb the forces associated with the impact event as the occupant 34 moves relative to the seat assembly 20. Providing the inflator assembly 18 proximate to the shoulder of the occupant 34 such that the first end 26 of the belt 12 is substantially stationary during normal use of the restraint device 10 allows the belt 12 to include a localized, wider-width portion (e.g., the extension 91) (FIG. 6), a foam pad 90, and/or an air bladder 92 located along a length of the belt 12 in conjunction with or as an alternative to the inflatable portion 14.

While the belt 12 is described as being capable of having a localized, wider-width portion (e.g., the extension 91), a foam pad 90, and/or an air bladder 92 located along a length of the belt 12 due to the first end 26 of the belt 12 being substantially stationary during normal use, the belt 12 may additionally include a localized, wider-width portion, a foam pad 90, and/or an air bladder 92 located along a length of the belt 12 in conjunction with or as an alternative to the inflatable portion 14 by providing the belt 12 with an adjustable portion that is located proximate to the wider-width portion, foam pad 90, air bladder 92, and/or inflatable portion 14, as will be described below.

With particular reference to FIG. 11, a restraint device 100 is provided and may include a first belt portion 102, a second belt portion 104, a buckle 106, and a tongue 108. The first belt portion 102 may be attached to the buckle 106 and the second belt portion 104 may be attached to the tongue 108, as shown in FIG. 11. When the tongue 108 is attached to the buckle 106, the first belt portion 102 and the second belt portion 104 are likewise attached to one another and the restraint device 100 is in a buckled state. When the restraint device 100 is in the buckled state, the first belt portion 102 and the second belt portion 104 may cooperate with the buckle 106 and the tongue 108 to restrain an occupant 110 in a seat assembly 112 of a mobile platform 114 (FIG. 13) such as a vehicle, aircraft, or bus.

The buckle 106 may receive an end 116 of the first belt portion 102 and may include an adjustment mechanism 118. The adjustment mechanism 118 may be moved between an engaged state restricting relative movement between the first belt portion 102 and the buckle 106 and a disengaged state permitting relative movement between the first belt portion 102 and the buckle 106.

When the adjustment mechanism 118 is in the engaged state, a length of the first belt portion 102 is substantially fixed. Conversely, when the adjustment mechanism 118 is in the disengaged state, the first belt portion 102 may be moved relative to and within the buckle 106 to adjust an effective length of the first belt portion 102. When a desired effective length of the first belt portion 102 is achieved, the adjustment mechanism 118 may be moved from the disengaged state to the engaged state to restrict further movement of the first belt portion 102 relative to the buckle 106. Accordingly, when the adjustment mechanism 118 of the buckle 106 is in the engaged state and is attached to the tongue 108, the overall length of the restraint device 100 (i.e., the first belt portion 102, the second belt portion 104, the buckle 106, and the tongue 108) is substantially fixed to accommodate the particular occupant 110.

The first belt portion 102 may additionally include an inflatable portion 120 that may be moved from a pre-deployed state to an inflated state when the mobile platform 114 experiences an impact event. The inflatable portion 120 may be identical to the inflatable portion 14 of the restraint device 10. Accordingly, the inflatable portion 120 may be positioned at virtually any location along the length of the first belt portion 102 and may be formed from the same material as the first belt portion 102 or, alternatively, may be formed from a different material than the first belt portion 102. Namely, the inflatable portion 120 may be formed from the same material as the first belt portion 102 such that the first belt portion 102 and the inflatable portion 120 are formed from an airbag-cushion material. Alternatively, the first belt portion 102 may be formed from conventional seatbelt webbing while the inflatable portion 120 is formed from an airbag-cushion material. If the first belt portion 102 is formed from seatbelt webbing and the inflatable portion 120 is formed from airbag-cushion material, the inflatable portion 120 may be attached to the first belt portion 102 via stitching (not shown).

Regardless of the particular construction of the first belt portion 102 and the inflatable portion 120, the inflatable portion 120 may be positioned along the length of the first belt portion 102 such that the inflatable portion 120 is positioned relative to a waist of the occupant 110 when the occupant 110 is seated in the seat assembly 112 (FIG. 13). The inflatable portion 120 may be moved from a pre-deployed state (FIGS. 11 and 13) to a deployed or inflated state (not shown) via an inflator assembly 122. Specifically, the inflatable portion 120 may be filled with a pressurized gas received from the inflator assembly 122 in an effort to utilize the inflatable portion 120 as a cushion to dissipate forces associated with an impact event experienced by the mobile platform 114 away from the occupant 110.

While the restraint device 100 is described and shown as including an inflatable portion 120 located along a length of the first belt portion 102, the restraint device 100 could additionally or alternatively include any of the wider-width portion (e.g., the extension 91), foam pad 90, and air bladder 92 described above with respect to the restraint device 10. The foregoing elements (i.e., wider-width portion (e.g., the extension 91), foam pad 90, and/or air bladder 92) may be used in conjunction with or in place of the inflatable portion 120 to absorb forces associated with an impact event experienced by the mobile platform 114. While the first belt portion 102 may include any combination of an inflatable portion 120, a wider-width portion (e.g., the extension 91), a foam pad 90, and an air bladder 92, the first belt portion 102 will be described and shown as only including an inflatable portion 120.

In operation, an occupant 110 may initially be seated in the seat assembly 112 prior to the tongue 108 being inserted into the buckle 106. Once the occupant 110 is seated in the seat assembly 112, the occupant 110 may position the first belt portion 102 relative to the second belt portion 104 such that the tongue 108 is received by the buckle 106. The tongue 108 may be inserted into the buckle 106 until the tongue 108 and the buckle 106 are fixed for movement with one another.

The effective length of the first belt portion 102 and, thus, the overall length of the restraint device 100, may be adjusted by adjusting a position of the first belt portion 102 relative to the buckle 106. Specifically, the adjustment mechanism 118 may be moved from the engaged state to the disengaged state by applying a force on the first belt portion 102 proximate to the end 116. Applying a force to the first belt portion 102 at the end 116 moves the adjustment mechanism 118 from the engaged state to the disengaged state and permits movement of the first belt portion 102 relative to and within the buckle 106.

Once a desired length of the first belt portion 102 is achieved, the force applied to the first belt portion 102 at the end 116 may be released, thereby causing the adjustment mechanism 118 to return to the engaged state. Returning the adjustment mechanism 118 to the engaged state restricts further movement of the first belt portion 102 relative to the buckle 106 and, thus, fixes the effective length of the first belt portion 102 and, as a result, fixes an effective length of the restraint device 100.

Adjustment of the first belt portion 102 relative to the buckle 106 may be accomplished by providing the first belt portion 102 with an adjustment zone 124 located between the end 116 of the first belt portion 102 and the inflatable portion 120. Specifically, the adjustment zone 124 may be defined between an end 126 of the inflatable portion 120, for example, and the end 116 of the first belt portion 102. Because the first belt portion 102 includes a substantially constant cross-sectional area extending from the first end 116 of the first belt portion 102 to the end 126 of the inflatable portion 120, the first belt portion 102 may be freely moved relative to and within the buckle 106 when the adjustment mechanism 118 is in the disengaged state.

The overall size of the adjustment zone 124 along with the overall length of the second belt portion 104 may be adjusted to ensure that a portion of the inflatable portion 120 is properly positioned relative to a waist area of the occupant 110 to ensure that the inflatable portion 120 absorbs forces associated with an impact event. Namely, the position of the inflatable portion 120 along a length of the first belt portion 102 may be adjusted by lengthening or shortening the second belt portion 104 and/or by lengthening or shortening the adjustment zone 124. For example, the inflatable portion 120 may be moved closer to a centerline of the seat assembly 112 by shortening the second belt portion 104 and/or by shortening the adjustment zone 124. Positioning the inflatable portion 120 closer to a centerline of the seat assembly 112 ensures that the inflatable portion 120 is properly positioned relative to a torso of the occupant 110 when the inflatable portion 120 is moved from the pre-deployed state to the deployed state.

The foregoing adjustment of the overall length of the first belt portion 102 is permitted until the end 126 of the inflatable portion 120 engages the buckle 106. Once the end 126 of the inflatable portion 120 engages the buckle 106, further movement of the end 116 of first belt portion 102 in the direction (Y; FIG. 11) and further movement of the inflatable portion 120 into the buckle 106 is not permitted due to the size of the inflatable portion 120. As described above, the inflatable portion 120 may be integrally formed with or attached to the first belt portion 102. Accordingly, the resulting structure causes the first belt portion 102 to have a localized, larger cross-sectional area, which is too large to pass through the buckle 106 or through the adjustment mechanism 118. In short, the inflatable portion 120 acts as a stop that further limits adjustment of the first belt portion 102.

As described above, the restraint device includes a first belt portion 102 that is adjustably connected to a buckle 106 such that an effective length of the first belt portion 102 may be adjusted to accommodate occupants 110 of varying sizes. The foregoing functionality of the first belt portion 102 is provided even though the first belt portion 102 may include an area of increased thickness at the inflatable portion 120.

With particular reference to FIG. 12, a restraint device 128 is provided. The restraint device 128 may include a first belt portion 130, a second belt portion 132, a tongue 134, and a buckle 136. When the tongue 134 is attached to the buckle 136, the first belt portion 130 is attached to the second belt portion 132 to allow the restraint device 128 to restrain an occupant 110 in a seat assembly 112 in a similar fashion as shown in FIG. 13 with respect to the restraint device 100.

The first belt portion 130 may be attached to the tongue 134 while the second belt portion 132 may be attached to the buckle 136. Attachment of the buckle 136 to the second belt portion 132 may be fixed such that a length of the second belt portion 132 is not adjustable. Conversely, the first belt portion 130 may be attached to the tongue 134 such that an effective length of the first belt portion 130 may be adjusted. For example, the tongue 134 may include an adjustment mechanism 138 movable between an engaged state and a disengaged state. When the adjustment mechanism 138 is in the engaged state, an effective length of the first belt portion 130 and, thus, the restraint device 128, is fixed. When the adjustment mechanism 138 is in a disengaged state, the first belt portion 130 may be moved relative to the tongue 134 to adjust an effective length of the first belt portion 130 and the restraint device 128.

The first belt portion 130 may include an end 140 that is spaced apart and separated from an inflatable portion 142. While the first belt portion 130 will be described and shown as including an inflatable portion 142, the first belt portion 130 could additionally or alternatively include any one or more of a wider-width portion (e.g., the extension 91), a foam pad 90, and an air bladder 92, as described above with respect to the restraint device 10. The inflatable portion 142 may be positioned along a length of the first belt portion 130 such that an end 144 of the inflatable portion 142 is spaced apart and separated from the end 140 of the first belt portion 130.

The end 140 of the first belt portion 130 may cooperate with the end 144 of the inflatable portion 142 to define an adjustment zone 146 extending between the end 140 and the inflatable portion 142. The adjustment zone 146 determines the amount of adjustment of the first belt portion 130 relative to the tongue 134 when the adjustment mechanism 138 is in the disengaged state. For example, the first belt portion 130 may be received by the tongue 134 and may move the adjustment mechanism 138 from the engaged state to the disengaged state by applying a force on the first belt portion 130 at the end 140. When the force is applied to the first belt portion 130, the first belt portion 130 may be moved relative to the tongue 134 to increase or decrease the effective length of the first belt portion 130 which, in turn, reduces or increases the effective length of the restraint device 128 when the tongue 134 is attached to the buckle 136.

In operation, a force may be applied to the first belt portion 130 proximate to the end 140 to adjust a position of the first belt portion 130 relative to the tongue 134. Adjustment of the first belt portion 130 relative to the tongue 134 may be accomplished by passing a portion of the first belt portion 130 through the tongue 134. If the force applied to the first belt portion 130 is in the direction (X), as shown in FIG. 12, an effective length of the first belt portion 130 and, thus, an effective length of the restraint device 128, is reduced. The force applied to the first belt portion 130 in the direction (X) may be continually applied until the end 144 of the inflatable portion 142 contacts the tongue 134. At this point, further movement of the first belt portion 130 in the direction (X) is restricted due to the larger cross-sectional area of the inflatable portion 142 compared to the cross-sectional area of the first belt portion 130.

The restraint device 128 may be used in place of the restraint device 100. For example, the restraint device 128 may be used in conjunction with an occupant 110 seated in the seat assembly 112 shown in FIG. 13. Namely, the second belt portion 132 may be anchored relative to the mobile platform 114 in a similar fashion as the second belt portion 104 of the restraint device 100. Likewise, the first belt portion 130 may be attached to the mobile platform 114 in a similar fashion as the first belt portion 102 of the restraint device 100 such that the inflator assembly 122 is in communication with the inflatable portion 142. Accordingly, operation of the restraint device 128 is similar to operation of the restraint device 100 when the restraint device 128 is used in conjunction with the seat assembly 112 of the mobile platform 114.

While operation of the restraint device 128 is similar to operation of the restraint device 100, adjustment of the first belt portion 130 relative to the second belt portion 132 is accomplished by moving the first belt portion 130 relative to the tongue 134 rather than adjusting a position of the first belt portion 130 relative to the buckle 136. In short, the restraint device 128 is similar to the restraint device 100 in that the first belt portion 130 is adjustable relative to the second belt portion 132 and includes an inflatable portion 142. However, such adjustment is provided by the tongue 134 rather than the buckle 136.

With particular reference to FIG. 14, a restraint device 148 is provided and may include a first belt portion 150, a second belt portion 152, a tongue 154, and a buckle 156. The first belt portion 150 may be selectively attached to the second belt portion 152 when the tongue 154 is attached to the buckle 156. Further, the first belt portion 150 may include an inflatable portion 158 and/or any or all of a wider-width portion (e.g., the extension 91), a foam pad 90, or an air bladder 92, as described above with respect to the restraint device 10. While the first belt portion 150 may include any or all of the foregoing elements, the first belt portion 150 will be described and shown hereinafter as including an inflatable portion 158.

The first belt portion 150 may be adjustable relative to the second belt portion 152 such that an effective length of the first belt portion 150 may be adjusted to accommodate occupants 110 of varying sizes. Adjustment of the effective length of the first belt portion 150 may be accomplished by providing the tongue 154 with a retractor 160. The retractor 160 may selectively pay out or spool up webbing of the first belt portion 150 depending on the size of the occupant 110 seated in the seat assembly 112 of the mobile platform 114. Positioning the retractor 160 within or proximate to the tongue 154 such that the retractor 160 selectively pays out or retracts webbing of the first belt portion 150 allows the inflatable portion 158 to be disposed along a length of the first belt portion 150. The retractor 160 may spool webbing of the first belt portion 150 until an end 162 of the inflatable portion 158 contacts the retractor 160. The end 162 is prevented from being spooled by the retractor 160, as the inflatable portion 158 includes a larger cross-sectional area than the webbing of the first belt portion 150.

In operation, an occupant 110 may be seated in the seat assembly 112 and may position the first belt portion 150 and the second belt portion 152 across a waist portion of the occupant 110. Positioning the first belt portion 150 relative to the second belt portion 152 may require the occupant 110 to apply a force on the tongue 154 to allow the retractor 160 to pay out a sufficient length of webbing. Once the first belt portion 150 is properly positioned across a waist portion of the occupant 110, the tongue 154 may be inserted into the buckle 156 to restrain the occupant 110 when seated in the seat assembly 112.

Should the mobile platform 114 experience an impact event, the inflator assembly 122 may provide the inflatable portion 158 with pressurized gas, thereby moving the inflatable portion 158 from a pre-deployed state to a deployed or inflated state to absorb forces associated with the impact event. Movement of the inflatable portion 158 from the pre-deployed state to the deployed state causes the inflatable portion 158 to be positioned relative to a torso of the occupant 110 to allow the occupant 110 to load the inflatable portion 158.

Under normal operating conditions (i.e., when the mobile platform 114 does not experience an impact event), the occupant 110 may disengage the tongue 154 from the buckle 156 to exit the seat assembly 112. In so doing, the retractor 160 associated with the tongue 154 may spool the webbing associated with the first belt portion 150 until the end 162 of the inflatable portion 158 contacts the tongue 154. At this point, the first belt portion 150 is disconnected from the second belt portion 152 and will remain disconnected until the tongue 154 is once again inserted into the buckle 156.

With particular reference to FIG. 15, a restraint device 164 is provided and may include a first belt portion 166, a second belt portion 168, a tongue 170, and a buckle 172. The tongue 170 may be attached to the second belt portion 168 while the buckle 172 may be attached to the first belt portion 166. When the tongue 170 is inserted into and attached to the buckle 172, the first belt portion 166 is likewise attached to the second belt portion 168. In this position, the first belt portion 166, the second belt portion 168, the tongue 170, and the buckle 172 may cooperate to restrain an occupant 110 seated in the seat assembly 112 of the mobile platform 114.

The first belt portion 166 may include an inflatable portion 174 located along a length thereof. While the first belt portion 166 will be described and shown hereinafter as including an inflatable portion 174, the first belt portion 166 could additionally or alternatively include any or all of a wider-width portion (e.g., the extension 91), a foam pad 90, or an air bladder 92, as described above with respect to the restraint device 10.

The first belt portion 166 may be attached to the mobile platform 114 such that a length of the first belt portion 166 is fixed. For example, the first belt portion 166 may include a first end (not shown) that is fixedly attached to the mobile platform 114 and a second end 176 that is attached to the buckle 172. The second belt portion 168 may include a first end (not shown) that is attached to the mobile platform 114 via a retractor 178 and a second end 180 that is attached to the tongue 170.

The retractor 178 may selectively pay out or spool up webbing associated with the second belt portion 168 and, therefore, provides a degree of adjustability to the restraint device 164. Namely, the retractor 178 allows the second belt portion 168 to be adjustable such that an effective length of the second belt portion 168 may be adjusted to accommodate occupants 110 of varying sizes.

In operation, an occupant 110 may be seated in the seat assembly 112 and may position the first belt portion 166 over a lap of the occupant 110. The occupant 110 may then position the second belt portion 168 relative to the lap of the occupant 110 by applying a force on the second belt portion 168. Applying a force on the second belt portion 168 causes the retractor 178 to pay out webbing of the second belt portion 168 to allow the tongue 170 of the second belt portion 168 to be placed in close proximity to the buckle 172 of the first belt portion 166.

Once the tongue 170 is sufficiently moved relative to the first belt portion 166 such that the tongue 170 engages the buckle 172, the retractor 178 fixes a length of the second belt portion 168 to prevent further payout of the second belt portion 168.

Should the mobile platform 114 experience an impact event, the inflator 122 may provide the inflatable portion 174 with pressurized gas to cause the inflatable portion 174 to move from a pre-deployed state to a deployed or inflated state. Movement of the inflatable portion 174 from the pre-deployed state to the deployed state causes the inflatable portion 174 to be positioned relative to a torso of the occupant 110, thereby allowing the inflatable portion 174 to absorb forces associated with the impact event.

Under normal operating conditions (i.e., when the mobile platform 114 does not experience an impact event), the occupant 110 may disengage the tongue 170 from the buckle 172 and exit the seat assembly 112. Once the tongue 170 is disconnected from the buckle 172, the retractor 178 may spool the webbing associated with the second belt portion 168 until the tongue 170 is disposed in close proximity to the retractor 178. Providing the second belt portion 168 with the retractor 178 allows an effective length of the second belt portion 168—and thus an effective length of the restraint device 164—to be selectively adjusted.

With particular reference to FIGS. 16 and 17, a restraint device 182 is provided. The restraint device 182 may include a first belt portion 184, a second belt portion 186, a tongue 188, and a buckle 190. The tongue 188 may be attached to the first belt portion 184 while the buckle 190 may be attached to the second belt portion 186. When the tongue 188 is attached to the buckle 190, the first belt portion 184 is attached to the second belt portion 186 to restrain an occupant 110 in the seat assembly 112 of the mobile platform 114.

The first belt portion 184 may include an inflatable portion 192 disposed along a length thereof. While the first belt portion 184 is described and shown as including an inflatable portion 192, the first belt portion 184 could additionally or alternatively include a wider-width portion (e.g., the extension 91), a foam pad 90, or an air bladder 92, as described above with respect to the restraint device 10.

The inflatable portion 192 may be fixed for movement with the first belt portion 184 by being integrally formed with the first belt portion 184 or by being attached to the first belt portion 184 such that when the first belt portion 184 is moved relative to the seat assembly 112, the inflatable portion 192 is likewise moved relative to the seat assembly 112. Movement of the first belt portion 184 relative to the seat assembly 112 may be accomplished by providing a retractor 194 disposed proximate to a shoulder of the occupant 110. The retractor 194 may selectively pay out or retract webbing of the first belt portion 184 to adjust an effective length of the first belt portion 184.

With continued reference to FIGS. 16 and 17, operation of the restraint device 182 will be described in detail. When an occupant 110 is initially seated in the seat assembly 112, the occupant 110 may apply a force on the first belt portion 184 to cause the retractor 194 to spool seatbelt webbing. Spooling seatbelt webbing from the retractor 194 allows the occupant 110 to extend the first belt portion 184 across a torso portion of the occupant 110 and, further, allows the tongue 188 to be brought into close proximity with the buckle 190. When the tongue 188 is brought into proximity with the buckle 190, the tongue 188 may be inserted into the buckle 190 to connect the first belt portion 184 to the second belt portion 186.

When the first belt portion 184 is moved relative to the occupant 110 such that the retractor 194 pays out seatbelt webbing, the tongue 188 may be moved relative to the first belt portion 184. Specifically, the tongue 188 may be slideably attached to the first belt portion 184 such that the tongue 188 is movable between the retractor 194 and an end 196 of the inflatable portion 192. Once the tongue 188 is attached to the buckle 190 such that the first belt portion 184 is attached to the second belt portion 186, the inflatable portion 192 is positioned proximate to a lap of the occupant 110. As such, should the mobile platform 114 experience an impact event, the inflator assembly 122 provides pressurized gas to the inflatable portion 192 to move the inflatable portion 192 from a pre-deployed state to a deployed or inflated state. In so doing, the inflatable portion 192 is positioned in close proximity to a torso of the occupant 110 to absorb forces associated with the impact event.

During normal operation (i.e., when the mobile platform 114 does not experience an impact event), the occupant 110 may disengage the tongue 188 from the buckle 190 to exit the seat assembly 112. Once the tongue 188 is disengaged from the buckle 190, the seatbelt webbing of the first belt portion 184 is disengaged from the second belt portion 186 and is retracted by the retractor 194. Once the retractor 194 sufficiently spools a length of the first belt portion 184, the first belt portion 184 is returned to the position shown in FIG. 16.

As described, the restraint device 182 includes an inflatable portion 194 disposed along a length of the first belt portion 184. The inflatable portion 192 is movable with the first belt portion 184 when the first belt portion 184 is positioned relative to the second belt portion 186. Permitting movement of the inflatable portion 192 along with the first belt portion 184 is accomplished by providing the retractor 194 proximate to a shoulder of the occupant 110 and, further, by positioning the tongue 188 between the retractor 194 and the end 196 of the inflatable portion 192.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A restraint system for a vehicle having a seat, the restraint system comprising:
    a belt portion including a torso portion operable to extend over a torso of an occupant during use and having a first end, a lap portion operable to extend over a lap of an occupant during use, and a second end and an inflatable portion, the belt portion attachable to the vehicle via a first retractor at the second end;
    an inflator for supplying the inflatable portion with pressurized gas; and
    a connector fluid connecting the inflatable portion to the inflator such that the connector permits the inflatable portion to be disconnected from the inflator when the connector is subjected to a force of a predetermined magnitude.

2. The restraint system of claim 1, wherein the first retractor is operable to permit the belt portion to payout in a first mode of operation and is operable to spool the belt portion in a second mode of operation.

3. The restraint system of claim 2, wherein the inflatable portion is integrally formed with the belt portion.

4. The restraint system of claim 2, wherein the inflatable portion is an airbag attached to the belt portion.

5. The restraint system of claim 2, wherein the inflator is disposed proximate to the first end of the belt portion.

6. The restraint system of claim 1, wherein the connector includes a first portion associated with the inflator and a second portion associated with the inflatable portion, the second portion operable to prevent pressurized gas from exiting the inflatable portion when the inflatable portion is pressurized and the second portion is disconnected from the first portion.

7. The restraint system of claim 1, wherein the first end is attached to the vehicle or a seatback of the seat via a second retractor, the second retractor permitting belt portion to payout when the belt portion is subjected to a force of a predetermined magnitude.

8. The restraint system of claim 7, wherein at least one of the first retractor and the second retractor is a pre-tensioning retractor.

9. The restraint system of claim 7, wherein the belt portion includes a tongue slidably supported along a length thereof, the tongue being selectively received by a buckle that is fixed for movement with the vehicle.

10. The restraint system of claim 9, wherein the belt portion includes at least one of an energy-absorbing material attached to or integrally formed therewith, an area of increased thickness, and an area of increased width disposed between the first end and the tongue.

11. A restraint system for a vehicle comprising:
a belt portion including a torso portion operable to extend over a torso of an occupant during use and having a first end, a second end and a lap portion operable to extend over a lap of an occupant during use, the belt portion being attached to the vehicle via a first retractor at the second end;
wherein the first end is attached to the vehicle or a seatback of a seat of the vehicle via a second retractor, the second retractor permitting the belt portion to payout when the belt portion is subjected to a force of a predetermined magnitude;
wherein the belt portion includes a tongue slidably supported along a length thereof, the tongue being selectively received by a buckle fixed for movement with the vehicle, the
tongue including a third retractor permitting the belt portion to payout when the belt portion is subjected to a force of a predetermined magnitude.

12. The restraint system of claim 11, wherein the tongue is selectively received by a buckle fixed for movement with the vehicle.

13. The restraint system of claim 12, wherein the buckle includes one of a fourth retractor, a load-limiting device, and a pre-tensioning device.

14. The restraint system of claim 12, wherein the belt portion includes an inflatable portion is disposed between the first end and the tongue.

15. A restraint system for a vehicle comprising:
a belt portion including a torso portion operable to extend over a torso of an occupant during use and having a first end, a lap portion operable to extend over a lap of an occupant during use, a second end, and an inflatable portion; and
an inflator fluidly connected with the inflatable portion via a connector, such that the connector permits the inflatable portion to be disconnected from the inflator when the connector is subjected to a force of a predetermined magnitude.

16. The restraint system of claim 15, further comprising a retractor operable to permit the belt portion to payout in a first mode of operation and operable to spool the belt portion in a second mode of operation.

17. The restraint system of claim 15, wherein a retractor is attached to the second end of the belt portion.

18. The restraint system of claim 15, wherein the inflatable portion is integrally formed with the belt portion.

19. The restraint system of claim 15, wherein the inflatable portion is an airbag attached to the belt portion.

20. The restraint system of claim 15, wherein the connector is disposed proximate to the first end of the belt portion.

21. The restraint system of claim 15, wherein the connector includes a first portion associated with the inflator and a second portion associated with the inflatable portion, the second portion operable to prevent pressurized gas from exiting the inflatable portion when the inflatable portion is pressurized and the second portion is disconnected from the first portion.

22. The restraint system of claim 15, wherein the first end of the belt portion is attached to the vehicle via a retractor, the retractor permitting the belt portion to payout when the belt portion is subjected to a force of a predetermined magnitude.

23. The restraint system of claim 15, wherein the belt portion includes a tongue slidably supported along a length thereof, the tongue being selectively received by a buckle that is fixed for movement with the vehicle.

24. The restraint system of claim 23, wherein the belt portion includes an area of increased thickness and/or increased width between the first end of the belt portion and the tongue.

25. The restraint system of claim 23, wherein the inflatable portion is disposed between the first end of the belt portion and the tongue.

26. The restraint system of claim 23, wherein the belt portion includes an energy-absorbing material attached to or integrally formed therewith, the energy-absorbing material disposed between the first end of the belt portion and the tongue.

* * * * *